United States Patent

(12) United States Patent
Marra et al.

(10) Patent No.: US 10,911,392 B1
(45) Date of Patent: Feb. 2, 2021

(54) COALESCED NOTIFICATIONS FOR SOCIAL GROUPS

(71) Applicant: Google Inc., Mountain View, CA (US)

(72) Inventors: Gregory Matthew Marra, San Francisco, CA (US); Eduardo Knust Thuler, Mountain View, CA (US); Alison Boncha, San Francisco, CA (US); Austin Chang, San Francisco, CA (US); Barbara Veloso Bacharach, Funcionarios (BR)

(73) Assignee: Google LLC, Mountain View, CA (US)

( * ) Notice: Subject to any disclaimer, the term of this patent is extended or adjusted under 35 U.S.C. 154(b) by 310 days.

(21) Appl. No.: 15/266,230

(22) Filed: Sep. 15, 2016

Related U.S. Application Data

(63) Continuation of application No. 13/549,383, filed on Jul. 13, 2012, now Pat. No. 9,461,833.

(51) Int. Cl.
G06F 3/00 (2006.01)
H04L 12/58 (2006.01)
H04L 29/08 (2006.01)
H04L 12/26 (2006.01)

(52) U.S. Cl.
CPC ............ H04L 51/32 (2013.01); H04L 43/16 (2013.01); H04L 51/24 (2013.01); H04L 67/26 (2013.01)

(58) Field of Classification Search
CPC ......... H04L 51/32; H04L 43/16; H04L 51/24; H04L 6726/043
See application file for complete search history.

(56) References Cited

U.S. PATENT DOCUMENTS

| 7,831,673 B1 | 11/2010 | Cohen et al. | |
| 8,533,611 B2 | 9/2013 | Katis et al. | |
| 2011/0029898 A1* | 2/2011 | Malik | G06Q 10/107 715/758 |
| 2012/0191817 A1 | 7/2012 | Sayan | |
| 2012/0223951 A1* | 9/2012 | Dunn | G06Q 10/10 345/467 |

(Continued)

OTHER PUBLICATIONS

USPTO, Non-Final Office Action for U.S. Appl. No. 13/549,383 dated Feb. 5, 2016, 20 pages.
(Continued)

*Primary Examiner* — Anil N Kumar
(74) *Attorney, Agent, or Firm* — Lowenstein Sandler LLP

(57) ABSTRACT

In one implementation a method is provided that includes receiving a coalesced notification from a client device associated with a social group. The coalesced notification indicating that a number of messages transmitted between a first and a second user of the social group meets a pre-determined number. In this regard, the messages comprise messages associated with the first user and messages associated with the second user. The coalesced notification is provided to a display without providing contents of the messages associated with the first user and the messages associated with the second user. An interaction with the coalesced notification is detected at the display. Based on the interaction, it is determined whether to present at the display new messages in a unified list. The unified list comprising a first portion of the messages associated with the first user and a second portion of the messages associated with the second user.

20 Claims, 12 Drawing Sheets

(56) References Cited

U.S. PATENT DOCUMENTS

2012/0297313 A1* 11/2012 Sharma ................ G06Q 10/10
　　　　　　　　　　　　　　　　　　　　　715/751
2013/0238971 A1* 9/2013 Zheng .................... H04L 51/16
　　　　　　　　　　　　　　　　　　　　　715/234

OTHER PUBLICATIONS

USPTO, Non-Final Office Action for U.S. Appl. No. 13/549,383 dated Mar. 10, 2015, 17 pages.
USPTO, Non-Final Office Action for U.S. Appl. No. 13/549,383 dated May 29, 2014, 17 pages.
USPTO, Final Office Action for U.S. Appl. No. 13/549,383 dated Jul. 30, 2015, 18 pages.
USPTO, Final Office Action for U.S. Appl. No. 13/549,383 dated Sep. 17, 2014, 18 pages.

\* cited by examiner

FIG. 3

COALESCED NOTIFICATIONS FOR SOCIAL GROUPS

CROSS-REFERENCE TO RELATED APPLICATION

This patent application is a continuation of U.S. Non-Provisional patent application Ser. No. 13/549,383, filed Jul. 13, 2012, entitled "Coalesced Notifications For Social Groups," which is incorporated herein by reference for all purposes.

BACKGROUND

A social network is used by users to keep in touch with each other. For example, a user can find high school friends, family, acquaintances, etc., by logging into a social network and performing a search based on names of other users. If the other users have accounts within the social network, their information is presented to the searching user so the searching user can invite the other users to keep in touch. Also, the social network allows a user to post text, videos, and images to communicate with other users and to maintain and/or enhance relationships with the other users.

When a user sends a post to another user in the social network, a notification is sent to the other user that the post is received. Sometimes, a user may get confused with such notifications.

SUMMARY

The present disclosure relates to generating and drilling down a coalesced notification that is associated with a social group.

In a variety of implementations, a method to merge messages is provided. When a member of a social group sends a first message to another member of the social group and a second member of the social group sends a second message to another member of the social group, a coalesced notification is displayed. The coalesced notification is displayed on display screens of client devices of one or more members of the social group. When a member selects the coalesced notification, a first portion of the first message or a second portion of the second message is displayed. When a member selects the first portion, the first message is displayed. Also, when a member selects the second portion, the second message is displayed. The merging of the first and second messages into the coalesced notification reduces a chance that a member is overwhelmed with a large number of message notifications when a large number of messages are communicated between members of the social group. A member can slowly drill down from the coalesced notification into a message that the member is interested in.

In a number of implementations, a method for generating coalesced notification data is described. The method includes receiving first message data. The first message data is configured to be processed to display a first message. The method includes receiving second message data, which is configured to be processed to display a second message. The method further includes determining whether the first message data and the second message data are associated with a social group and merging the first message data and the second message data to generate coalesced notification data in response to determining that the first message data and the second message data are associated with the social group. The method includes providing the coalesced notification data via a network to a client device. The coalesced notification data is processed to display a coalesced notification at the client device. The coalesced notification provides controls to display an interface that includes a first portion of the first message and a second portion of the second message in a unified list.

In various implementations, the operation of receiving the first message data includes receiving data regarding the first message. The first message is sent from a first user account to the social group or to a member of the social group. The first user account is maintained within the social group.

In several implementations, the operation of receiving the second message data includes receiving data regarding the second message, which is sent from a second user account to the social group or to a member of the social group. The second user account is maintained within the social group.

In various implementations, the operation of determining whether the first message data and the second message data is associated with the social group includes determining whether the first message data is sent from a first user account of a first user who is a member of the social group to the social group or to a member of the social group. Also the operation of determining whether the first message data and the second message data is associated with the social group includes determining whether the first message data is sent from a second user account of a second user who is a member of the social group to the social group or to a member of the social group.

In a number of implementations, the operation of merging the first message data and the second message data to generate the coalesced notification data includes merging a total number of the first and second messages with identities of one or more users who sent the first and second messages.

In several implementations, the operation of providing the coalesced notification data via the network to the client device includes sending the coalesced notification data through the network to the client device for display.

In various implementations, the social group is part of a social network.

In a number of implementations, each of the first portion and second portion includes an interface for expanding either the first or second portion in a respective window that expands from the unified list.

In several implementations, the method includes receiving third message data after the interaction with the coalesced notification. The third message data is processed to display a third message. The method includes determining whether the third message data is associated with the social group and merging the first message data, the second message data, and the third message data to generate additional coalesced notification data in response to determining that the third message data is associated with the social group. The method includes replacing the coalesced notification data with the additional coalesced notification data and providing the additional coalesced notification data to the client device. The additional coalesced notification data is processed to display an additional coalesced notification at the client device. The additional coalesced notification provides controls to display the first portion, the second portion, and a third portion of the third message in a unified list. The third portion includes an interface for expanding the third portion in a window that expands from the unified list.

In several implementations, a computer-readable medium containing programming instructions is described. The programming instructions are executable by one or more processors of a computer system. The programming instructions include an instruction for displaying a coalesced notification at a client device. The coalesced notification notifies a user of receipt of first and second messages. The programming instructions further include an instruction for determining whether an indication of an interaction with the coalesced notification is received, an instruction for displaying a first portion of the first message and a second portion of the second message in a unified list in response to determining that the indication of the interaction is received, and an instruction for determining whether an indication of an interaction with the first portion or the second portion is received. The programming instructions also include an instruction for displaying the first message in a first window in response to determining that the indication of the interaction with the first portion is received. The programming instructions include an instruction for displaying the second message in a second window in response to determining that the indication of the interaction with the second portion is received.

In a number of implementations, the instruction for determining whether the indication of the interaction with the coalesced notification is received includes an instruction for determining whether the indication of a hover over or a selection of the coalesced notification is received from an input device.

In several of implementations, the instruction for displaying the first portion or the second portion in the unified list includes an instruction for displaying an interface. The interface includes the first portion and a second portion and is displayed besides the coalesced notification.

In a number of implementations, the instruction for determining whether the indication of the interaction with the first portion or the second portion is received includes an instruction for determining whether an indication of a selection of or hover over the first portion or the second portion is received from an input device.

In a various implementations, the instruction for displaying the first message in the first window includes an instruction for displaying the first window that is located beside the unified list.

In several implementations, the instruction for displaying the second message in the second window includes an instruction for displaying the second window that is located beside the unified list.

In various implementations, a method for drilling down from a coalesced notification to a first message or a second message is described. The method includes displaying a coalesced notification, which notifies a user of receipt of first and second messages. The method further includes determining whether an indication of interaction with the coalesced notification is received. The method includes displaying a first portion of the first message and a second portion of the second message in a unified list in response to determining that the indication of the interaction is received. The method includes determining whether an indication of an interaction with the first portion or the second portion is received, displaying the first message in a first window in response to determining that the indication of the interaction with the first portion is received. The method includes displaying the second message in a second window in response to determining that the indication of the interaction with the second portion is received.

In various implementations, the operation of determining whether the indication of interaction with the coalesced notification is received includes determining whether an indication of a hover over or a selection of the coalesced notification is received from an input device.

In several implementations, the operation of displaying the first portion or the second portion in the unified list includes displaying an interface that includes the first portion and the second portion. The interface is displayed besides the coalesced notification.

In a number of implementations, the method includes displaying a push notification, determining whether an indication of an interaction with the push notification is received, and displaying the coalesced notification in response to determining that the indication of the interaction with the push notification is received.

In various implementations, a system for generating coalesced notification data is described. The system includes a network interface controller configured to receive first message data, which is to be processed to display a first message. The network interface controller is further configured to receive second message data, which is to be processed to display a second message. The system further includes a processor configured to determine whether the first message data and the second message data are associated with a social group. The processor is configured to merge the first message data and the second message data to generate coalesced notification data in response to determining that the first message data and the second message data are associated with the social group. The network interface controller is configured to provide the coalesced notification data via a network to a client device. The coalesced notification data is processed to display a coalesced notification at the client device. The coalesced notification provides controls to display an interface that includes a first portion of the first message and a second portion of the second message in a unified list.

In a number of implementations, the processor is configured to merge a number of the first and second messages with identities of one or more users who sent the first and second messages.

In several implementations, each of the first portion and second portion includes an interface for expanding either the first or second portion in a respective window that expands from the unified list.

These implementations may provide one or more of the following advantages. Merging of first and second messages into a coalesced notification reduces a chance that a user will be confused and overwhelmed with a large number of messages that are communicated within a social group. For example, instead of a large number, e.g., 100, 200, 1000, etc., of notifications that notifies a user that a large number, e.g., 100, 200, 1000, etc., of messages are communicated within a social group, one coalesced notification is generated to notify a user that members of the social group have communicated the large number of messages. A user can then interact with the coalesced notification to determine which of the large number of messages the user is interested in viewing.

Other aspects will become apparent from the following detailed description, taken in conjunction with the accompanying drawings.

BRIEF DESCRIPTION OF THE DRAWINGS

Various implementations of the present disclosure may best be understood by reference to the following description taken in conjunction with the accompanying drawings.

FIG. 3 is a diagram of multiple windows that illustrate drilling down from a coalesced notification to a detailed message, in accordance with several implementations of the present disclosure.

DETAILED DESCRIPTION

The following implementations describe systems and methods for generating and drilling down a coalesced notification that is associated with a social group.

Figure 1A:
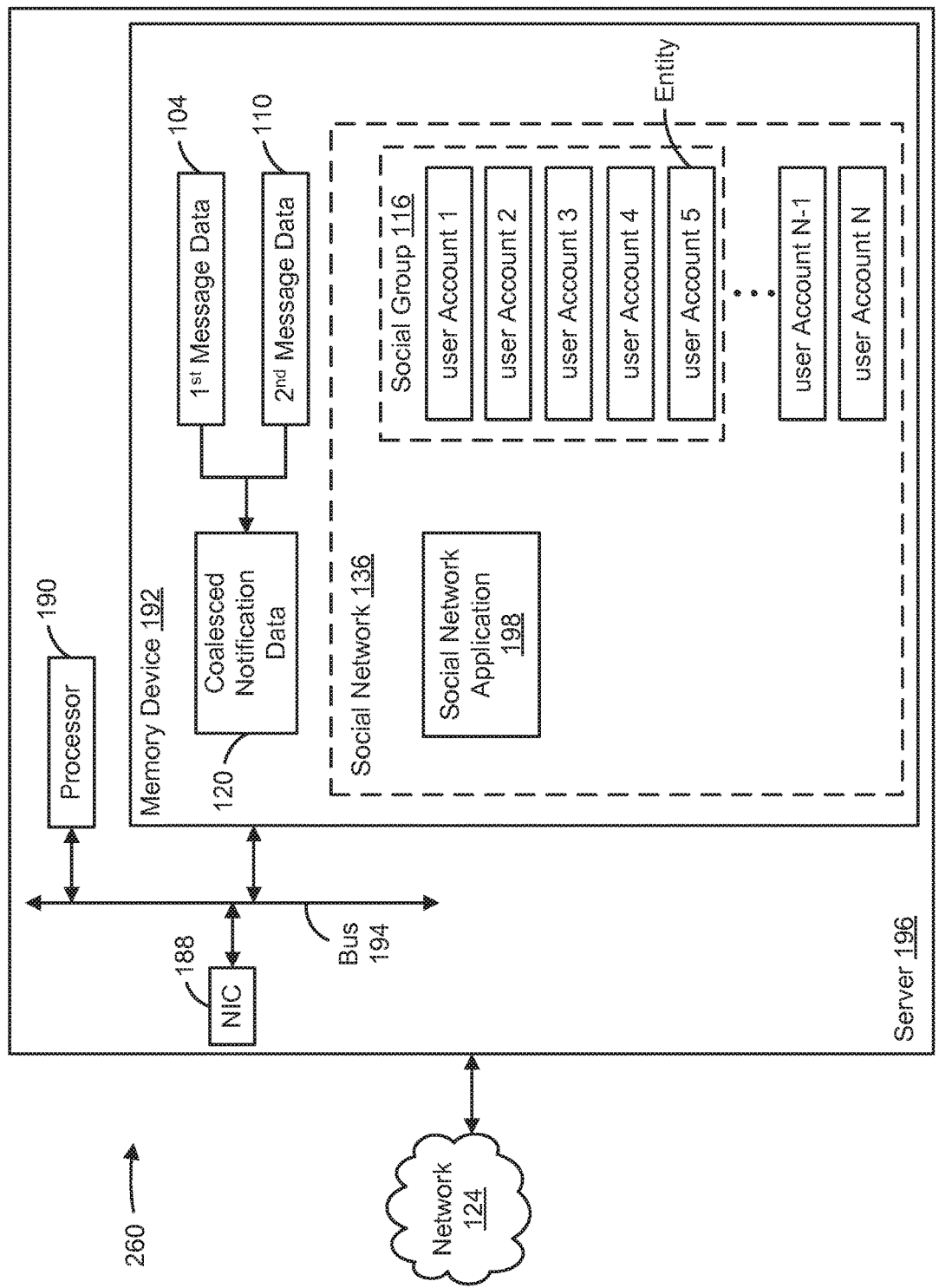
FIG. 1A is a block diagram of a portion of an architecture for coalescing notifications, in accordance with various implementations of the present disclosure.
Figure 1B:
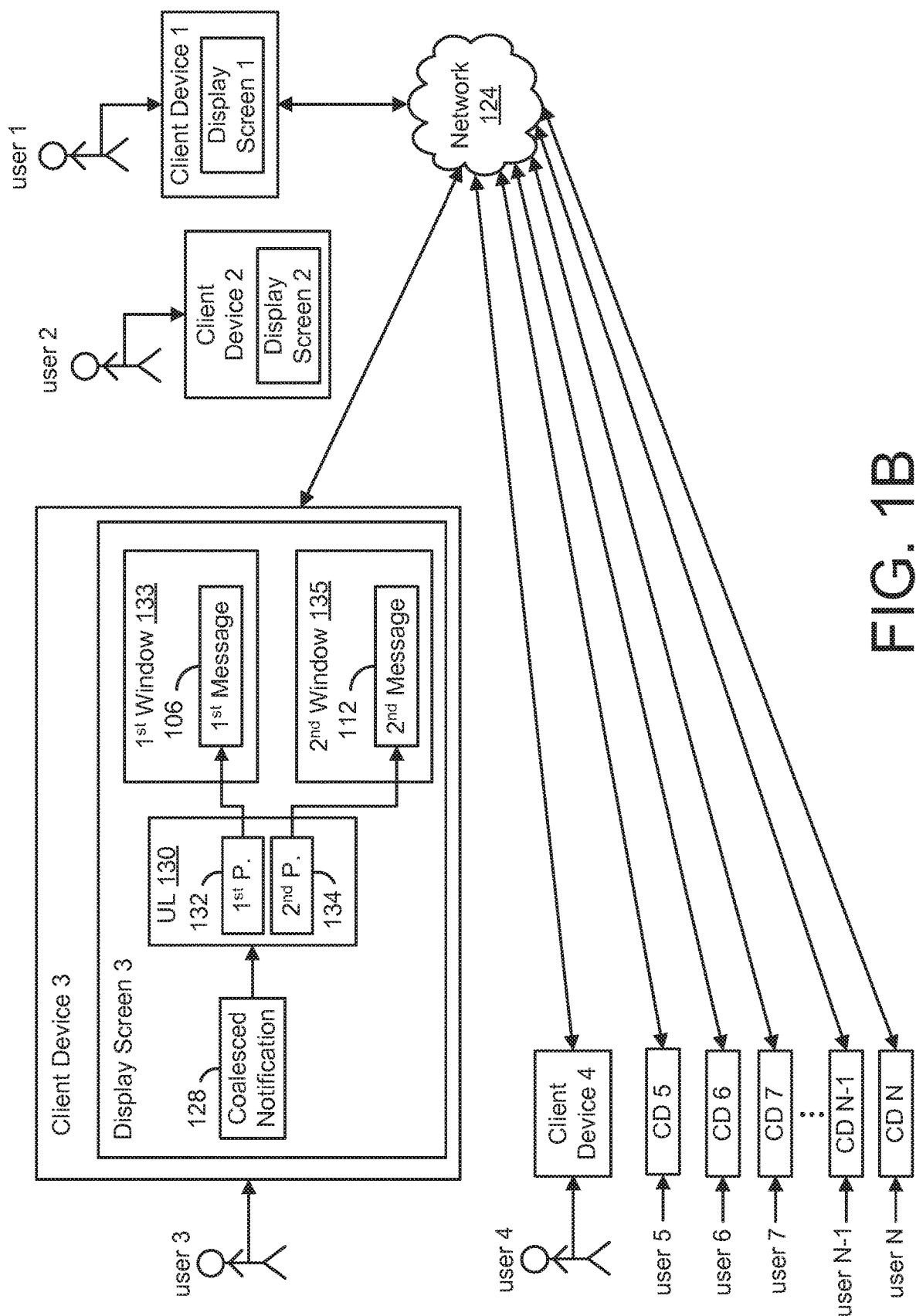
FIG. 1B is a block diagram of the remaining portion of the architecture of FIG. 1A, in accordance with several implementations of the present disclosure.

FIG. 1A is a block diagram of various implementations of a portion of an architecture 260 for coalescing notifications and FIG. 1B is a block diagram of several implementations of the remaining portion of the architecture 260. A memory device 192 of a server 196 includes user accounts 1 thru N of respective users 1 thru N, where N is an integer greater than zero. For example, the user account N is assigned by a processor 190 of the server 196 to the user N. The processor 190 assigns the user account N after receiving user information, e.g., a user name, a password, an answer to a security question, an email address, a birth date, any other information identifying the user N, or a combination thereof. As another example, the user account 1 is assigned to the user 1. A processor, as used herein, includes an application specific integrated circuit (ASIC), a field programmable gate array (FPGA), a microprocessor, a controller, a processing unit, or a central processing unit (CPU).

The user accounts 1 thru N are web accounts within a social network 136. Within the social network 136, the processor 190 executes a social network service application 198 to provide a social network service to the users 1 thru N via the user accounts 1 thru N. For example, the processor 190 executes the social network application 198 to allow the user N to log into the user account N and share a message with one or more of the other users 1 thru N-1 via the respective user accounts 1 thru N-1. A message includes an image, text, a video, an audio, or a combination thereof, e.g., multimedia. In various implementations, data of a message is stored, at least temporarily, within the memory device 192 by the processor 190. In a number of implementations, a message is a post or a comment. Also, a user is allowed to log into a user account that is assigned to the user when the user information is authenticated by the processor 190 or a processor (not shown) of an authentication server (not shown).

When the processor 198 executes the social network application 198, the user N is provided with features, e.g., features that allow the user N to post a message within the user account N, to comment on a message posted within the user account N, to chat with the other users 1 thru N-1 via messages, or a combination thereof. Moreover, when the social network application 198 is executed, a social network service that includes the features is provided at one or more of client devices 1 thru N by the server 196 via a network 124. Examples of the network 124 include a wired network, a combination of a wireless network and a wired network, a local area network (LAN), a wide area network (WAN), a combination of WAN and a LAN, the Internet, an Intranet, and a combination of the Internet and an Intranet.

The user account 5 is assigned to an entity, e.g., a corporation, a limited liability company, a cooperative, a nonprofit organization, a for-profit organization, or a partnership. A person within the entity, e.g., an employee of the entity, a consultant of the entity, etc., logs into the user account 5 to communicate with other users 1 thru 4 and 6 thru N. The person is an example of the user 5.

The users 1 thru 4 are members of the entity. The user 1, 2, 3, or 4 is invited to join the entity by another user, e.g., user 5, user N-1, etc., who may or may not be a member of the entity. For example, information regarding the entity is sent in a message by the user 4 via the user account 4 and the user account 1 to the user 1. When the user 1 logs into the user account 1, the user 1 views a notification, e.g., a push notification. The user 1 selects the push notification via an input device of the client device 1. A graphical processing unit (GPU) of the client device 1 displays the message sent by the user 4 in response to receiving a selection of the notification. The message is displayed on a window that also includes a visit or view button. When the user 1 selects the visit or view button via the input device of the client device 1, the GPU displays a website of the entity that is maintained within the social network 136. The user 1 views the website and decides to follow the entity. The website includes posts or comments from other users regarding the entity and/or products/services offered by the entity. In various implements, the terms post and comment are used interchangeably herein. The website displays a follow button. When the follow button is selected by the user 1, the user 1 starts following the entity and becomes a member of the entity.

It should be noted that the website of the entity within the social network 136 is different than a webpage of the entity outside the social network 136. For example, the website of the entity within the social network 136 is managed, e.g., updated, created, controlled, etc., by an organization, other than the entity, that manages the social network 136. The webpage is managed by the entity.

As another example of sending and accepting an invitation for membership of the entity, the user 1 is invited to join the entity by the user 2, 3, 4, or 5. In this example, the user 1 logs into his/her user account 1 and views a notification regarding an invitation to join the entity. The invitation is displayed on a display screen 1 of the client device 1 in the form of an invite button and an identity of the entity. The invitation is sent from the user account 2, 3, 4, or 5 to the user account 1. The user 1 views the invitation and decides to accept the invitation. The user 1 accepts the invitation when the user 1 selects the invite button that is displayed on the display screen 1. The user 1 becomes a member of the entity when the user 1 selects the invite button.

As yet another example, the user 1 logs into the user account 1 to receive information regarding the entity or to receive the invitation. The user 1 visits the website of the entity within the social network 136. The website of the entity includes instructions for the user 1 to provide the user information and/or other information regarding the user 1 to become a member of the entity. Examples of the other information include answers to questions, e.g., how did the user 1 hear about the entity, why is the user 1 interested in becoming a member, social security number of the user 1, credit card number of a credit card of the user 1, etc. When the user information and/or the other information is received by the entity and/or authenticated by the entity, the user 1 becomes a member of the entity. In various implementations, the user 1 pays to become a member of the entity.

When the users 1 thru 4 become members of the entity, the user accounts 1 thru 4 become a part of a social group 116. In several implementations, the social group 116 is displayed as a representative object, e.g., a logo of the entity, a name of the entity, multimedia identifying the entity, a circle, a square, a polygon, etc., on a display screen of the client device 5 when the user 5 logs into the user account 5 and identities of the users 1 thru 4 are displayed with respect to, e.g., adjacent to, besides, within, outside, etc., the representative object.

In a number of implementations, a social group includes members that have interest in discussing a topic, an idea, a theme, etc. by using a social network or an online website. In these implementations, the user accounts 1 thru 4 become part of the social group when the users 1 thru 4 discuss the topic, idea, theme, etc. For example, the user account 1 becomes part of the social group when the user 1 sends a message to the user 2, 3, and/or 4 to discuss the topic. As another example, the user account 2 becomes part of the social group when the user 2 sends a message to the user 1, 3 and/or 4 to discuss the topic. In these implementations, no direct action is required by the entity to allow the users 1, 2, 3, and 4 to become members of the social group. For example, there is no need for the entity to send invitations to the users 1 thru 4 to allow the users to become members of the social group. The users 1 thru 4 become members of the social group by using the social network to send messages regarding the topic, idea, theme, etc. to each other. A message is sent from a first user to a second user via a social network when the message is posted within an account of the first user and addressed to an account of the second user.

In a variety of implementations, a social group includes members that post within a thread of a social network. In these implementations, the user accounts 1 thru 4 become part of the social group when the user 1 creates a thread by posting a message to the user account 1, the user 2 posts to the thread by commenting about the post of the user 1, and so on until the user 4 posts to the thread. A user posts to a thread to comment about a discussion that occurs within the thread. In these implementations, no direct action is required by the entity to allow the users 1, 2, 3, and 4 to become members of the social group. For example, there is no need for the entity to send invitations to the users 1 thru 4 to allow the users to become members of the social group. The users 1 thru 4 become members of the social group by using the social network to send messages within the same thread to each other. In a number of implementations, a user posts to a thread to indicate his/her like about a post that is posted by another user to the thread. In several implementations, a user posts to a thread to comment regardless of whether the comment is about the discussion that occurs within the thread.

Moreover, in various implementations, the social group 116 is displayed as a symbol within a user account of a member of the social group 116. For example, the user 1 logs into the user account 1 and views an image, e.g., circle, square, polygon, etc., that represents the social group 116 and uses the input device of the client device 1 to drag the user information of the users 2, 3, and 4 into the image. In this example, the users 2, 3, and 4 are social network friends of the user 1.

In various implementations, users are social network friends in addition to being members of the entity. For example, a first user becomes a social network friend of a second user when the first user receives permission from the second user to become the social network friend. To illustrate further, the first user logs into the user account 1 and selects an add button that is displayed besides the user information of the user 2 to send a request to the user account 2 to add the user 2 as a social network friend of the user 1. The user 2 logs into the user account 2 and selects an accept button to accept the request. When the user 2 accepts the request, the user 2 becomes a social network friend of the user 1. In several implementations, users are not social network friends but are members of the entity.

The user 1 logs into the user account 1 and sends a first message 106 to the social group 116 via the user account 1. When the user 1 sends the first message 106 to the social group 116, the users 2, 3, 4, and 5 of the social group 116 receive a notification within their respective user accounts 2, 3, 4, and 5 that a message is communicated. In several implementations, when the user 1 sends the first message 106 to a member of the social group 116, e.g., the user accounts 2, 3, 4, or 5, the users 2, 3, 4, and 5 receive a notification that the first message 106 is communicated. In various implementations, the user account 1 lacks reception of a notification that the first message 106 is sent.

Moreover, when the user 1 sends the first message 106, a network interface controller (NIC) of the client device 1 sends the first message 106 in the form of first message data 104 via the network 124 to the server 196. Examples of a NIC include a network adapter and a network interface card. In various implementations, the first message data 104 is rendered by a GPU of a client device to display the first message 106. A NIC 188 of the server 196 receives the first message data 104 and stores the first message data 104 within the user accounts 2, 3, 4, and 5 within the memory device 192. The NIC 188, the processor 190, and the memory device 192 are coupled with each other via a bus 194 of the server 196.

Furthermore, the user 2 logs into the user account 2 and sends a second message 112 to the social group 116 via the user account 2. When the user 2 sends the second message 112 to the social group 116, the users 1, 3, 4, and 5 of the social group 116 receive a notification within their respective user accounts 1, 3, 4, and 5 that a message is received. In several implementations, when the user 2 sends the second message 112 to a member of the social group 116, e.g., the user accounts 1, 3, 4, or 5, the users 1, 3, 4, and 5 receive a notification that the second message 112 is communicated. In various implementations, the user account 2 lacks reception of a notification that the second message 112 is sent.

Moreover, when the user 2 sends the second message 112, a NIC of the client device 2 sends the second message 112 in the form of second message data 110 via the network 124 to the server 196. In various implementations, the second message data 110 is rendered by a GPU of a client device to display the second message 112. The NIC 188 receives the second message data 110 and stores the second message data 110 within the user accounts 1, 2, 4, and 5 within the memory device 192.

The processor 190 generates coalesced notification data 120 from the first message data 104 and the second message data 110. For example, the processor 190 determines a total number of the first and second messages 106 and 112 that are sent by the users 1 and 2, determines the user information regarding the sending users, determines an identity of the social group 116, and generates the coalesced notification data 120 that includes the number, the identity, the user information, or a combination thereof. In various implementations, an identity of a social group includes a name of the entity, an image of the entity, or any other data that identifies the entity, data identifying a topic, data identifying an idea, and/or data identifying a thread. In various implementations, an identity of the social group 116 is the same as an identity of the entity. In several implementations, an identity of the social group 116 is derived from an identity of the entity. For example, an identity of the social group 116 is a reminiscent of an identity of the entity. As another example, an identity of the social group 116 includes a part of an identity of the entity.

In various implementations, the processor 190 stores the coalesced notification data 120 within the memory device 192, and associates, e.g., links or establishes a relationship between, the coalesced notification data 120 and the user accounts 3, 4, and 5. For example, the processor 190 stores the coalesced notification data 120 in the same row of a table as that in which identities, e.g., alphanumeric characters, of the user accounts 3, 4, and 5 are stored.

The processor 190 instructs the NIC 188 to send the coalesced notification data 120 via the network 124 to the client devices 3, 4, and 5. In addition, in several implementations, the processor 190 instructs the NIC 188 to send instructions via the network 124 to the client devices 3, 4, and 5 regarding how and when to display a coalesced notification 128, a first portion 132 of the first message 106, a second portion of the second message 112, the first message 106, and the second message 112. The GPUs of the client devices 3, 4, and 5 apply a rendering program and the instructions received from the processor 190 to the coalesced notification data 124 to display the coalesced notification 128. For example, the coalesced notification 128 is displayed on a display screen 3 of the client device 3. When the users 3, 4, and 5 log into their respective user accounts 3, 4, and 5, the users 3, 4, and 5 view the coalesced notification 128. When both the first message 106 and the second message 112 are sent, the users 3, 4, and 5 receive the coalesced notification 128 within their respective user accounts 3, 4, and 5 that two messages are communicated by members of the entity.

The user 3 selects via an input device of the client device 3 the coalesced notification 128. A coalesced notification provides controls, e.g., touch screen controls, input device controls, that when interacted by a user results in a display of a unified list. In response to receiving an indication of the selection of the coalesced notification 128, the GPU of the client device 3 further executes the instructions received from the processor 190 and the rendering program to display the first portion 132 and the second portion 134 within a unified list 130. In several implementations, an indication is a signal that is generated when an interaction occurs between a user via an input device of a client device and a notification or a portion of a message. A unified list is an interface, e.g., a window, that is displayed on the display screen 3. In several implementations, a unified list or a window is displayed in any shape, e.g., oval, circular, etc., other than rectangular shape. In various implementations, a unified list includes data, text, or multimedia. For example, the unified list includes one or more graphical icons, visual indicators, or a combination thereof. The data or multimedia within a unified list identifies senders of messages, a number of the messages, brief excerpts from the messages, summaries of the messages, theme of the messages, topic of the messages, idea within the messages, a thread that includes the messages, or a combination thereof. In a number of implementations, a unified list includes a thread.

In various implementations, a unified list includes sections that separate data that identifies theme, topic, idea, thread, social group, entity, etc. from other data that identifies a sender of a message. Each section provides a different output when an input is received from a user via an input device of a client device. For example, when a section that identifies a sender of a message receives a selection from a user, the message is displayed. As another example, when a section that identifies theme, topic, idea, thread, social group, entity, etc. receives a selection from a user, the user is directed to a web page that provides information, e.g., multimedia about the theme, topic, idea, thread, social group, entity, etc. The web page is part of a social network.

In a number of implementations, a unified list is a graphic that organizes content from merged messages into a separate organized group of messages. In these implementations, the unified list is associated with computer code that enables interaction with items, e.g., messages, in the unified list.

A window allows an interaction to occur between a user and one or more graphical objects that are displayed within the window. In various implementations, a window provides an interface between a user and a processor. For example, a user can interact with a processor via a window. In several implementations, windows are two dimensional objects arranged on a plane called a desktop. In a number of implementations, a window can be resized, moved, hidden, restored or closed by a user via an input device of a client device. In various implementations, windows include other graphical objects, e.g., a menu-bar, a toolbar, a control, an icon, a working area, or a combination thereof. In several implementations, in a working area, a document, an image, folder contents, multimedia, or another object is displayed within a window.

In several implementations, when an indication of a selection of the coalesced notification 128 is received, the first portion 132 is displayed in one window and the second portion 134 is displayed in another window.

In several implementations, when an indication of a selection of the coalesced notification 128 is received, there is a lack of display of the unified list 130. For example, there is a lack of expansion of the coalesced notification 128 into the unified list 130 when an indication of an interaction with the coalesced notification 128 is received by the GPU of the client device 3.

The user 3 selects the first portion 132 and/or the second portion 134 via the input device of the client device 3. When an indication of a selection of the first portion 132 is received, the GPU of the client device 3 applies the instructions and the rendering program to display the first message 106 within a first window 133. For example, the first portion 132 includes an interface that is interacted with to display the first window 133 that expands from the unified list 130. Also, when an indication of a selection of the second portion 134 is received, the GPU of the client device 3 applies the instructions and the rendering program to display the second message 112 within a second window 135. For example, the second portion 134 includes an interface that is interacted with to display the second window 135 that expands from the unified list 130.

In several implementations, when an indication of a selection of a the first portion 132 is received, there is a lack of display of the first message 106 and when an indication of a selection of the second portion 134 is received, there is a lack of display of the second message 112. For example, there is a lack of expansion of the unified list 130 into the first window 133 when an indication of an interaction with the first portion 132 is received by the GPU of the client device 3 or into the second window 135 when an indication of an interaction with the second portion 134 is received by the GPU of the client device 3.

In various implementations, when an indication of a selection of the first portion 132 or the second portion 134 is received, the first message 106 and the second message 112 are displayed within one window, e.g., the first window 133 or the second window 135.

It should be noted that in several implementations, the operations, described herein, as performed by the processor 190 are performed by more than one processor. Moreover, in various implementations, the operations that are described herein as performed by the server 196 are performed by two or more servers. Also, in a number of implementations, data stored within the memory device 192 is stored in more than one memory device.

Moreover, it should be noted that although names, e.g., visit button, view button, etc., are provided to various buttons described herein, in several implementations, other names are provided to the various buttons. In various implementations, the terms users and user accounts are used interchangeably herein.

It should be noted that although four users 1 thru 4 are indicated as members of the social group 116, in several implementations, the social group 116 includes any number of users as members.

In various implementations, instead of selecting the coalesced notification 128, the users 3, 4, or 5 hovers a cursor over the coalesced notification 128 via the input device of the corresponding client device 3, 4, and 5. In several implementations, a selection or a hovering is an example of an interaction. When an indication of the hovering is received, the unified list 130 is displayed on the corresponding display screen 3, 4, and 5.

Figure 2:
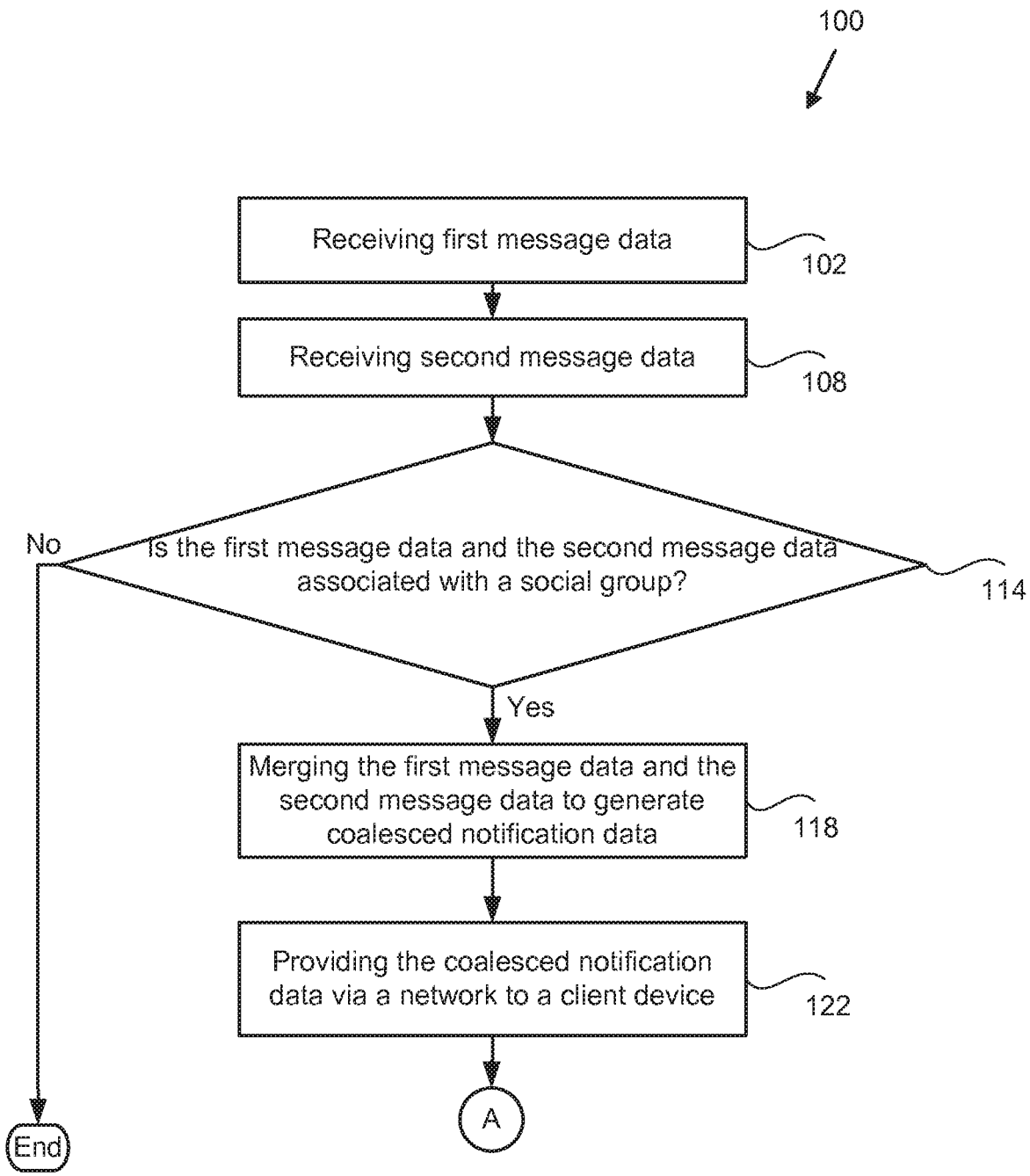
FIG. 2 is a flowchart of a method for generating coalesced notification data, in accordance with various implementations of the present disclosure.

FIG. 2 is a flowchart of various implementations of a method 100 for generating the coalesced notification data 120 (FIG. 1A). The method 100 is executed by one or more processors of one or more servers. For example, the method 100 is executed by the processor 190 (FIG. 1A).

In an operation 102, the first message data 104 is received by the NIC 188 via the network 124 from the client device 1 when the first message 106 is sent from the user account 1 to the social group 116, e.g., the user account 5 (FIG. 1A), to a member, e.g., user accounts 2, 3, or 4, of the social group 116, or to a user of a social group.

Similarly, in an operation 108, the second message data 108 is received by the NIC 188 via the network 124 from the client device 2 (FIG. 1A). The second message 112 is sent from the user account 2 to the social group 116, to a member of the social group 116, or to a user of a social group.

Moreover, in an operation 114, it is determined whether the first message data 104 and the second message data 108 are associated with a social group, e.g., the social group 116. For example, it is determined whether the first message data 104 is sent from a member of the social group 116 to the social group 116, to a member of the social group 116, or to a user of a social group and whether the second message data 108 is sent from a member of the social group 116 to the social group 116, to a member of the social group 116, or to a user of a social group. As another example, it is determined whether the first message data 104 is designated to be sent from the user account 1 to the user account 2, 3, 4, or 5 and the second message data 108 is sent from the user account 2 to the user account 1, 3, 4, or 5.

In response to determining that the first message data 104 and the second message data 108 lack association with the social group 116, the method 100 ends. On the other hand, in response to determining that the first message data 104 and the second message data 108 are associated with the social group 116, in an operation 118, the first message data 104 is merged with the second message data 108. For example, the first message data 104 and the second message data 108 are combined to generate the coalesced notification data 120 (FIG. 1A), which includes a total number of messages that are displayed based on the first message data 104 and the second message data 108. In several implementations, a message is displayed based on message data when a GPU of a client device applies the rendering program to the message data to display the message. The coalesced notification data 120 includes an identity of the user 1 who sends the first message data 104 and an identity of the user 2 who sends the second message data 108. In a number of implementations, the coalesced notification data 120 includes an identity of the user 1, an identity of the user 2, an identity of the social group 116, an identity of a topic, an identity of a theme, an identity of an idea, an identity of a thread, a total number of messages that are displayed based on the first message data 104 and the second message data 108, or a combination thereof.

In an operation 122, the coalesced notification data 120 is provided via the network 124 (FIG. 1A) to one or more client devices. For example, the NIC 188 (FIG. 1A) sends the coalesced notification data 120 via the network 124 to NICs of the client devices 3, 4, and 5. When the users 3, 4, and 5 log into their corresponding user accounts 3, 4, and 5, the GPU of the corresponding client devices 3, 4, and 5 renders the coalesced notification data 120 to display the coalesced notification 128 on the corresponding display screens 3, 4, and 5. The coalesced notification 128 notifies the user 3, 4, and 5 that the first message 106 and the second message 112 are received within the corresponding user accounts 3, 4, and 5. In various implementations, the method 100 ends after the operation 122.

Figure 3:
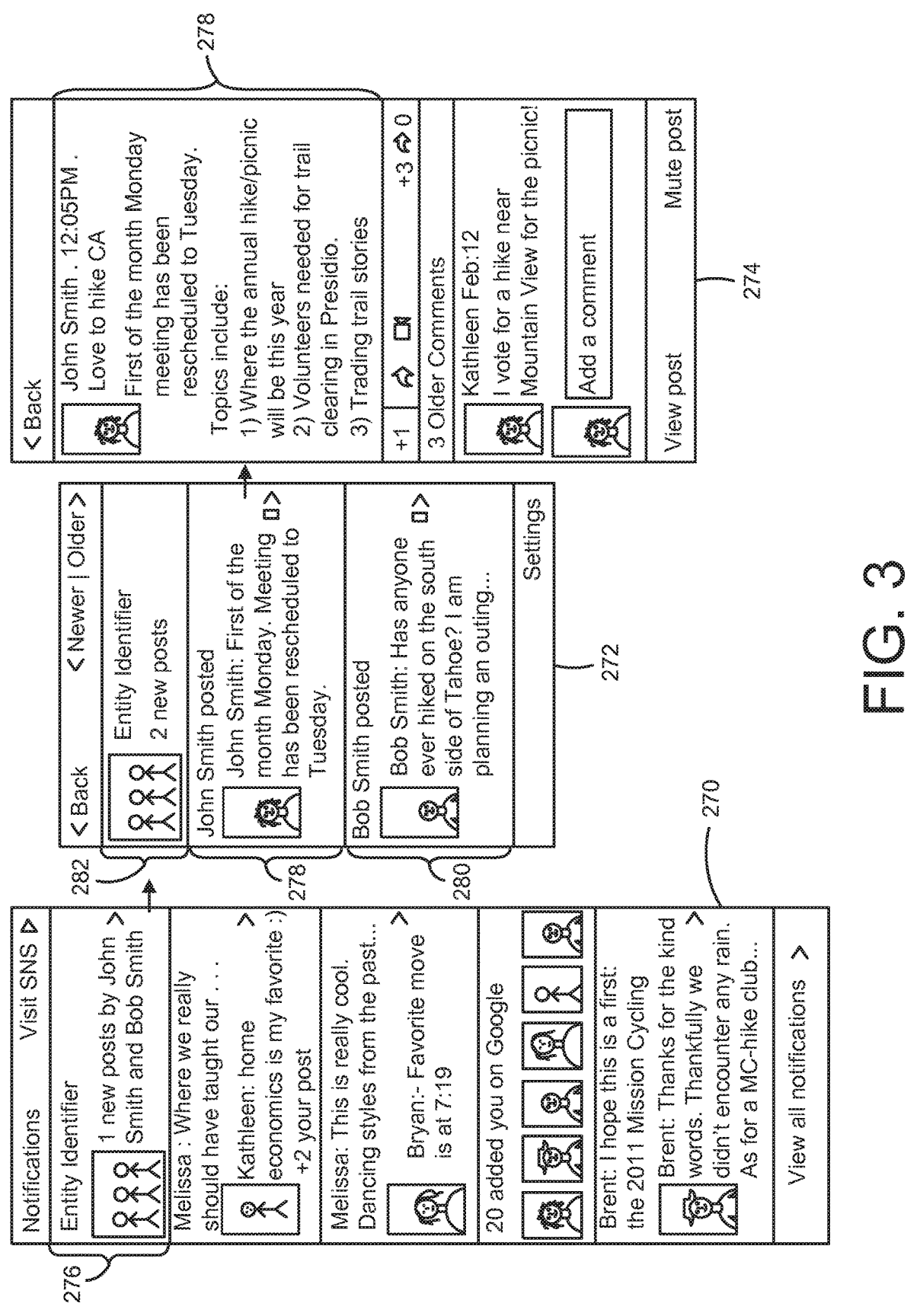

FIG. 3 is a diagram of various implementations of windows 270, 272, and 274 that illustrate drilling down from a coalesced notification 276 to a detailed message 278. The coalesced notification 276 is an example of the coalesced notification 128 (FIG. 1B) and the detailed message 278 is an example of the first message 106 (FIG. 1B). Moreover, the window 274 is an example of the first window 133 (FIG. 1B). When the user 3 logs into his/her user account 3 (FIG. 1A) and the first message 106 (FIG. 1B) is sent from a user account of John Smith to the social group 116 and the second message 112 (FIG. 1B) is sent from a user account of Bob Smith to the social group 116, the coalesced notification 276 is displayed by the GPU of the client device 3 on the display screen 3 (FIG. 1A).

The coalesced notification 276 indicates to the user 3 that two new posts are posted by John Smith and Bob Smith. Also the coalesced notification 276 includes an example of an identity of the social group 116.

In response to receiving an indication of a selection of the coalesced notification 276 from the input device of the client device 3, the GPU of the client device 3 displays a first portion 278 of the detailed message 278 and a second portion 280 of another detailed message (not shown). The first portion 278 is an example of the first portion 132 (FIG. 1B) and the second portion 280 is an example of the second portion 134 (FIG. 1B).

The window 272 includes a portion 282 that includes an identity of the social group 116 and a total number of the posts that are posted by John Smith and Bob Smith. A list of the first portion 278, the second portion 280, and the portion 282 is an example of the unified list 130 (FIG. 1B). In various implementations, information within the portion 282 is included as information within the portion 278 and/or within the portion 280.

In response to receiving an indication of a selection of the first portion 278, the GPU of the client device 3 displays the detailed message 278 within the window 274. It should be noted that the detailed message 278 lacks an identity of the social group 116. In various implementations, the detailed message 278 includes an identity of the social group 116.

Figure 4A:
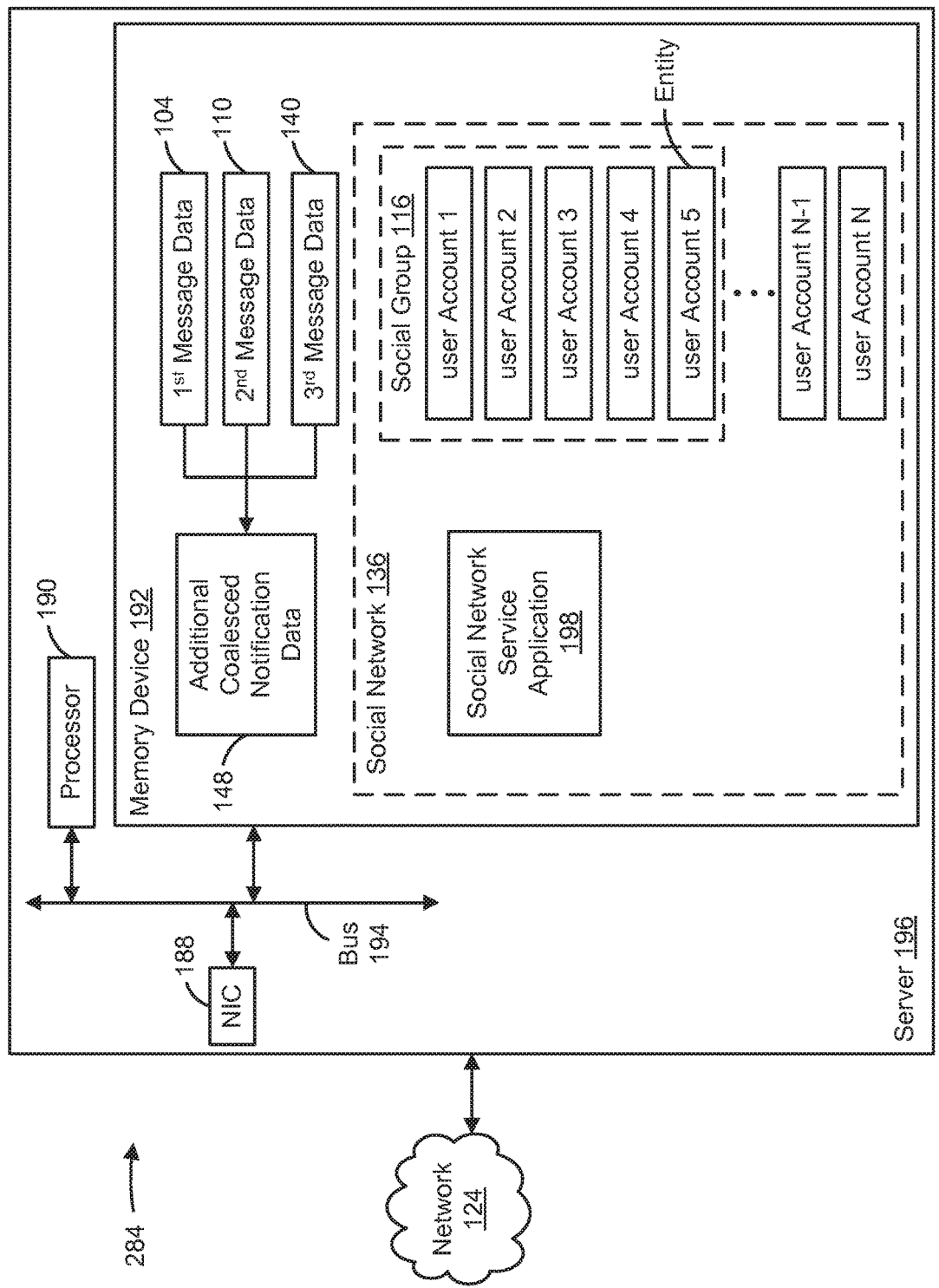
FIG. 4A is a block diagram of a portion of an architecture that is used to generate additional coalesced notification data from first message data, second message data, and third message data, in accordance with various implementations of the present disclosure.
Figure 4B:
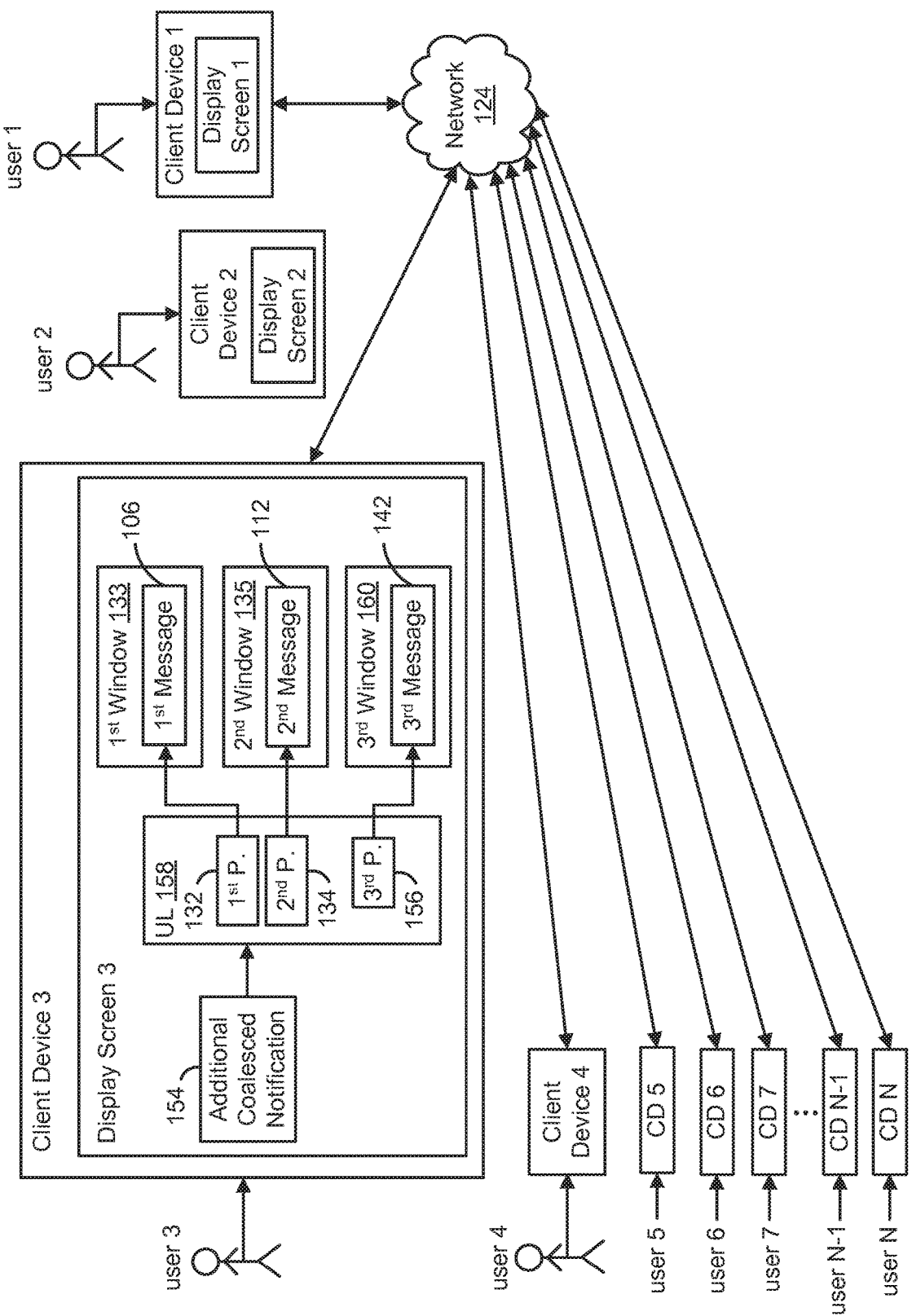
FIG. 4B is a block diagram of the remaining portion of the architecture of FIG. 4A, in accordance with several implementations of the present disclosure.

FIG. 4A is a block diagram of several implementations of a portion of an architecture 284 that is used to generate additional coalesced notification data 148 from first message data 104, second message data 110, and third message data 140. FIG. 4B is a block diagram of various implementations of the remaining portion of the architecture 284.

When the user 1 sends a third message 142 to the social group 116, the users 2, 3, 4, and 5 of the social group 116 receive a notification within their respective user accounts 2, 3, 4, and 5 that a message is received. In several implementations, a message, e.g., the first message 106, the second message 112, the third message 142, etc. is sent from one member of the social group 116 to another member of the social group 116. In these implementations, when a member sends a message to another member, the remaining members of the social group 116 receive a notification that the message is communicated. For example, a message from one member of the social group 116 to another member of the social group 116 is shared with the remaining users when the message is posted by the sending member within his/her user account. In various implementations, the user account 1 lacks reception of a notification that the third message 142 is sent.

Moreover, when the user 1 sends the third message 142, the NIC of the client device 1 sends the third message 142 in the form of third message data 140 via the network 124 to the server 196. In several implementations, the third message 142 is sent from the client device 1 after the coalesced notification 128 (FIG. 1B) is selected by the user 3, 4, or 5. In a number of implementations, the third message 142 is sent by any other user 2, 3, or 4 of the social group 116 to the social group 116 or to a member of the social group 116. In various implementations, the third message data 140 is rendered by a GPU of a client device to display the third message 142.

The NIC 188 receives the third message data 140. The processor 190 determines that the third message data 140 is designated to be sent to the user account 5 or to a member, e.g., user account 2, 3, or 4, of the social group 116, and upon determining so, stores the third message data 140 within the user accounts 2, 3, 4, and 5.

The processor 190 merges the third message data 140 with the first message data 104 and the second message data 110 to generate the additional coalesced notification data 148. For example, the processor 190 adds a number of messages that are communicated between members of the social group 116 and incorporates the total number into the additional coalesced notification data 148. To illustrate further, the processor 190 adds a number of the first message 106, a number of the second message 112, and a number of the third message 142 to generate a total number three, and incorporates the number three into the additional coalesced notification data 148.

In various implementations, the processor 190 adds a number of messages that are sent by members of the social group 116 from a past date until a present date and incorporates the total number within the additional coalesced notification data 148. For example, the processor 190 adds a number of messages sent between members of the social group 116 from Jun. 6, 2011 until today. As another example, the processor 190 adds a number of messages sent by members of the social group 116 from Aug. 6, 2010 until today. As another example, the processor 190 adds a pre-determined number of messages that are sent by members of the social group 116 and incorporates the total number into the additional coalesced notification data 148. For example, when 16 messages are sent by of the social group 116, the processor 190 adds the latest 10 messages, which is an example of the pre-determined number, and incorporates the number 10 into the additional coalesced notification data 148. As another example, when 22 messages are sent between members of the social group 116, the processor 190 adds the latest 15 messages, which is an example of the pre-determined number, and incorporates the number 15 into the additional coalesced notification data 148.

As yet another example of generating the additional coalesced notification data 148 from the first message data 104, the second message data 110, and the third message data 140, the processor 190 obtains an identity of the user 1 who sent the first message 106 from the first message data 106, an identity of the user 2 who sent the second message 112 from the second message data 110, and the identity of the user 1 who sent the third message 142 from the third message data 140. In this example, the processor 190 incorporates the identities of the users 1 and 2 into the additional coalesced notification data 148.

As another example of generating the additional coalesced notification data 148 from the first message data 104, the second message data 110, and the third message data 140, the processor 190 obtains an identity of the social group 116, an identity of the user 1 who sent the first message 106, an identity of the user 2 who sent the second message 112, the identity of the user 1 who sent the third message 142, and a total number of the messages 106, 112, and 142. In this example, the processor 190 incorporates the identities of the users 1 and 2, the identity of the social group 116, the total number, or a combination thereof, into the additional coalesced notification data 148. It should be noted that in implementations where members of a social group are formed based on discussing about a topic, theme, idea, etc., instead of the name of the social group 116, multimedia data that identifies the topic, theme, idea, etc. is used in the preceding example. Moreover, it should be noted that in implementations where members of a social group are formed based on posting to a thread, instead of the name of the social group 116, multimedia that identifies the thread is used in the preceding example.

As yet another example of generating the additional coalesced notification data 148, the processor 190 obtains the user information regarding members of the social group 116 who sent messages from a past date to a present date, an identity of the social group 116, a total number of the messages, or a combination thereof. In this example, the processor 190 incorporates the user information, the identity of the social group 116, the total number of the messages, or a combination thereof, into the additional coalesced notification data 148.

As another example of generating the additional coalesced notification data 148, the processor 190 obtains the user information regarding members of the social group 116 who sent the pre-determined number of messages, an identity of the social group 116, and the pre-determined number. In this example, the processor 190 incorporates the user information, the identity of the social group 116, the pre-determined number, or a combination thereof, into the additional coalesced notification data 148.

The processor 190 instructs the NIC 188 to send the additional coalesced notification data 148 via the network 124 to the client devices 3, 4, and 5. In addition, in several implementations, the processor 190 creates instructions regarding how and when to display an additional coalesced notification 154, a unified list 158, the first window 134, the second window 135, and a third window 160, and commands the NIC 188 to send the instructions, a third portion 156 of the third message 142, and the third message 142 via the network 124 to the client devices 3, 4, and 5.

The GPUs of the client devices 3, 4, and 5 apply a rendering program and the instructions received from the processor 190 to the additional coalesced notification data 148 to display the additional coalesced notification 154. For example, the additional coalesced notification 154 is displayed on a display screen 3 of the client device 3. When the users 3, 4, and 5 log into their respective user accounts 3, 4, and 5, the users 3, 4, and 5 view the additional coalesced notification 154. When the third message 142 is sent after an indication of a selection of the coalesced notification 128 (FIG. 1B) is received from the user 3, the user 3 receives the additional coalesced notification 154 within the user account 3 that one message is received. The additional coalesced notification 154 notifies the user 3 that the third message 142 is received within the user account 3.

The user 3 selects via an input device of the client device 3 the additional coalesced notification 154. In response to receiving an indication of the selection of the additional coalesced notification 154, the GPU of the client device 3 further executes the instructions received from the processor 190 and the rendering program to display the first portion 132, the second portion 134, and the third portion 156 within the unified list 156.

In several implementations, when an indication of a selection of the additional coalesced notification 154 is received, there is a lack of display of the unified list 156. For example, there is a lack of expansion of the additional coalesced notification 154 into the unified list 156 when an indication of an interaction with the additional coalesced notification 154 is received by the GPU of the client device 3.

In various implementations, the first portion 132 and the second portion 134 are displayed within the unified list 130 (FIG. 1B) and the third portion 156 is displayed within another unified list. In various implementations, the other unified list is displayed below, above, or to the side of the unified list 130. In several implementations, the other unified list is displayed adjacent to the unified list 130.

In several implementations, when an indication of a selection of the additional coalesced notification 154 is received, the first portion 132 is displayed in one window, the second portion 134 is displayed in another window, and the third portion 156 is displayed in yet another window.

In a number of implementations, when an indication of a selection of the additional coalesced notification 154 is received, the first portion 132 and the second portion 134 are not displayed within the unified list 158, and the third portion 156 is displayed within the unified list 156.

The user 3 selects the third portion 156 via the input device of the client device 3. When an indication of a selection of the third portion 156 is received, the GPU of the client device 3 applies the instructions and the rendering program to display the third message 142 within a third window 160. For example, the third portion 156 includes an interface that is interacted with to display the third window 160 that expands from the unified list 158. In various implementations, the third window 160 is located beside, e.g., next to, the unified list 156 and the unified list 156 is located beside the additional coalesced notification 154.

In several implementations, when an indication of a selection of the third portion 156 is received, there is a lack of display of the third message 142. For example, there is a lack of expansion of the unified list 156 into the third window 160 when an indication of an interaction with the third portion 156 is received by the GPU of the client device 3.

In various implementations, when an indication of a selection of the first portion 132, the second portion 134, or the third portion 156 is received, the messages 106, 112, and 142 are displayed within one window, e.g., the first window 133, the second window 135, or the third window 160.

Figure 5:
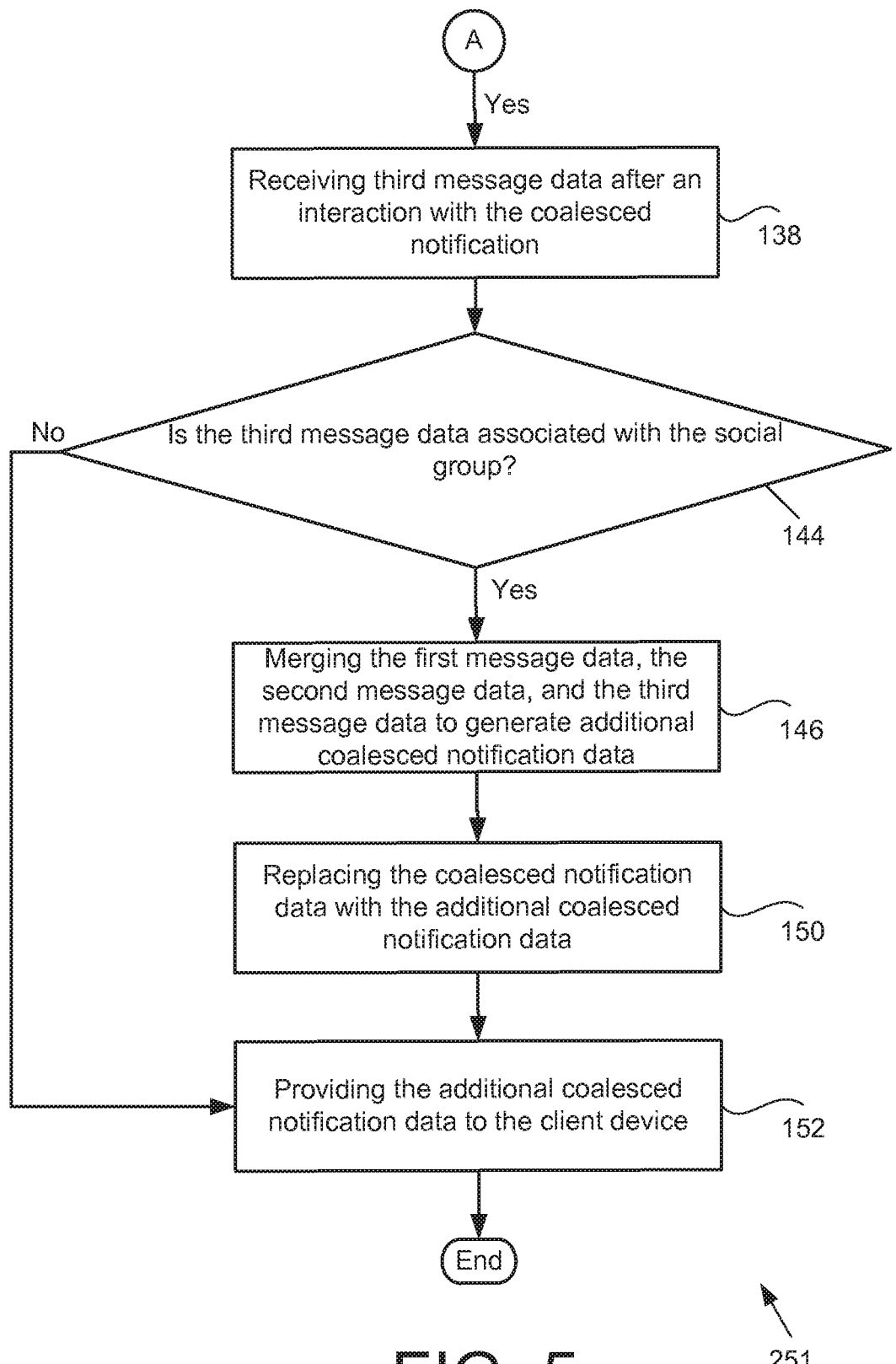
FIG. 5 is a flowchart of a method for generating the additional coalesced notification data, in accordance with various implementations of the present disclosure.

FIG. 5 is a flowchart of several implementations of a method 251 for generating the additional coalesced notification data 148 (FIG. 4A). The method 251 is executed by one or more processors, e.g., the processor 190 (FIG. 4A), of one or more servers. In several implementations, the method 251 is executed after execution of the method 100 (FIG. 2).

In an operation 138, the third message data 140 (FIG. 4A) is received after an interaction with the coalesced notification 128 (FIG. 1B) by the user 3, 4, or 5 via the input device of the corresponding client device 3, 4, or 5 (FIG. 1B). For example, the NIC of the client device 1 sends the third message data 140 via the network 124 to the server 196 (FIG. 4A) after the user 3, 4, or 5 selects the coalesced notification 128 via the input device of the corresponding client device 3, 4, or 5. As another example, the NIC of the client device 1 sends the third message data 140 after the user 3 hovers a cursor over the coalesced notification 128 via the input device of the client device 3.

In an operation 144, it is determined whether the third message data 140 is associated with the social group 116 (FIG. 4A). For example, it is determined whether the third message data 140 is sent from a member of the social group 116 to the social group 116 or to a member of the social group 116. As another example, it is determined whether third message data 140 is designated to be sent from the user account 1 to the user account 2, 3, 4, or 5.

In response to determining that the third message data 140 lacks association with the social group 116, the method 251 ends. On the other hand, in response to determining that the third message data 140 is associated with the social group 116, in an operation, the third message data 140 is merged with the first message data 104 and the second message data 110 (FIG. 4A) to generate the additional coalesced notification data 148. For example, the first message data 104, the second message data 108, and the third message data 140 are combined to generate the additional coalesced notification data 148 (FIG. 4A) by applying the rendering program to the first message data 104, the second message data 108, and the third message 140.

In an operation 150, the coalesced notification data 120 (FIG. 1A) is replaced with the additional coalesced notification data 148. For example, the processor 190 deletes the coalesced notification data 120 from the memory device 192 and stores the additional coalesced notification data 148 within the memory device 192. In several implementations in which the coalesced notification data 120 is linked with the user accounts 3, 4, and 5, the link is removed and a link is established between the additional coalesced notification data 148 and the user accounts 3, 4, and 5. For example, the processor 190 removes the coalesced notification data 120 from the row of the table and substitutes the additional coalesced notification 148 in that row.

In an operation 152, the additional coalesced notification data 148 is provided to the client devices 3, 4, and 5. For example, the NIC 188 sends the additional coalesced notification data 148 via the network 124 to the client devices 3, 4, and 5.

The NIC of the client devices 3, 4, and 5 receives the additional coalesced notification data 148. When the user 3, 4 or 5 logs into the corresponding user account 3, 4, or 5 via the corresponding client device 3, 4, or 5, the GPU of the client device applies the rendering program to display the additional coalesced notification 154 on a display screen of the client device. The method 251 ends after the operation 152.

Figure 6:
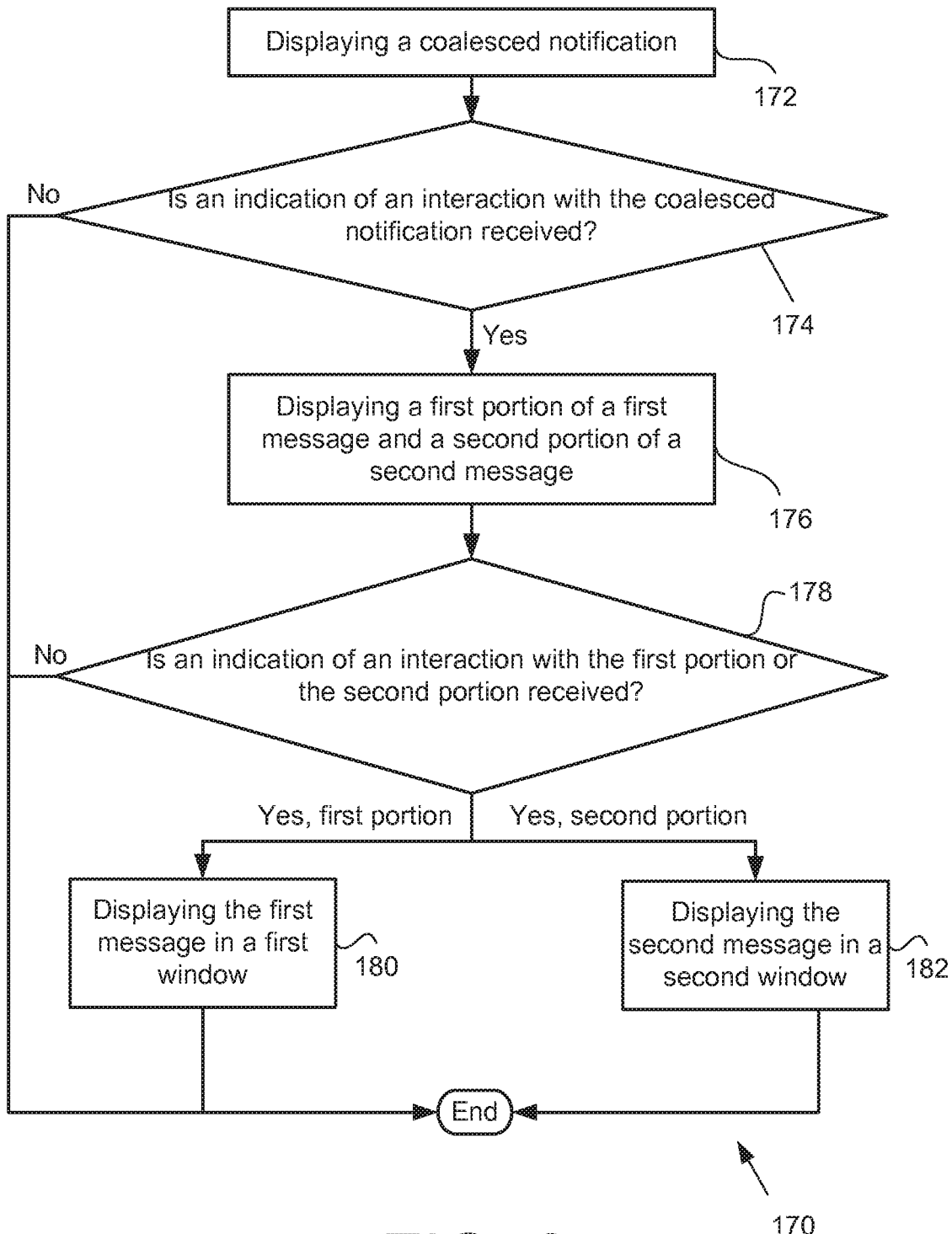
FIG. 6 is a flowchart of a method for drilling down from the coalesced notification to display a first message or a second message, in accordance with several implementations of the present disclosure.

FIG. 6 is a flowchart of various implementations of a method 170 for displaying the first message 106 or the second message 112 (FIG. 4B). The method 170 is performed by one or more processors of a client device, e.g., the client device 3, 4, or 5 (FIG. 1A). In several implementations, the method 170 is performed by a processor of a client device and a GPU of the client device. In a number of implementations, the method 170 is performed by a GPU of a client device.

In an operation 172, the coalesced notification 128 (FIG. 1B) is displayed on the display screen 3, 4, or 5. Moreover, in an operation 174, it is determined whether an indication of an interaction with the coalesced notification 128 is received. In response to determining that the indication of the interaction with the coalesced notification 128 is not received, the method 170 ends.

On the other hand, in response to determining that the indication of the interaction with the coalesced notification 128 is received, in an operation 176, the first portion 132 and the second portion 134 (FIG. 1B) are displayed within the unified list 130 (FIG. 1B). In an operation 178, it is determined whether an indication of an interaction with the first portion 132 or the second portion 134 is received. In response to determining that the indication of the interaction with the first portion 132 or the second portion 134 is not received, the method 170 ends.

On the other hand, in response to determining that the indication of the interaction with the first portion 132 is received, in an operation 180, the first message 106 is displayed within the first window 133. In various implementations, the first window 133 is located beside the unified list 130 and the unified list 130 is located beside the coalesced notification 128. Also, in response to determining that the indication of the interaction with the second portion 134 is received, in an operation 182, the second message 112 is displayed within the second window 135. In various implementations, the second window 135 is located beside the unified list 130 and the unified list 130 is located beside the coalesced notification 128. The method 170 ends after the operations 180 and 182.

Figure 7:
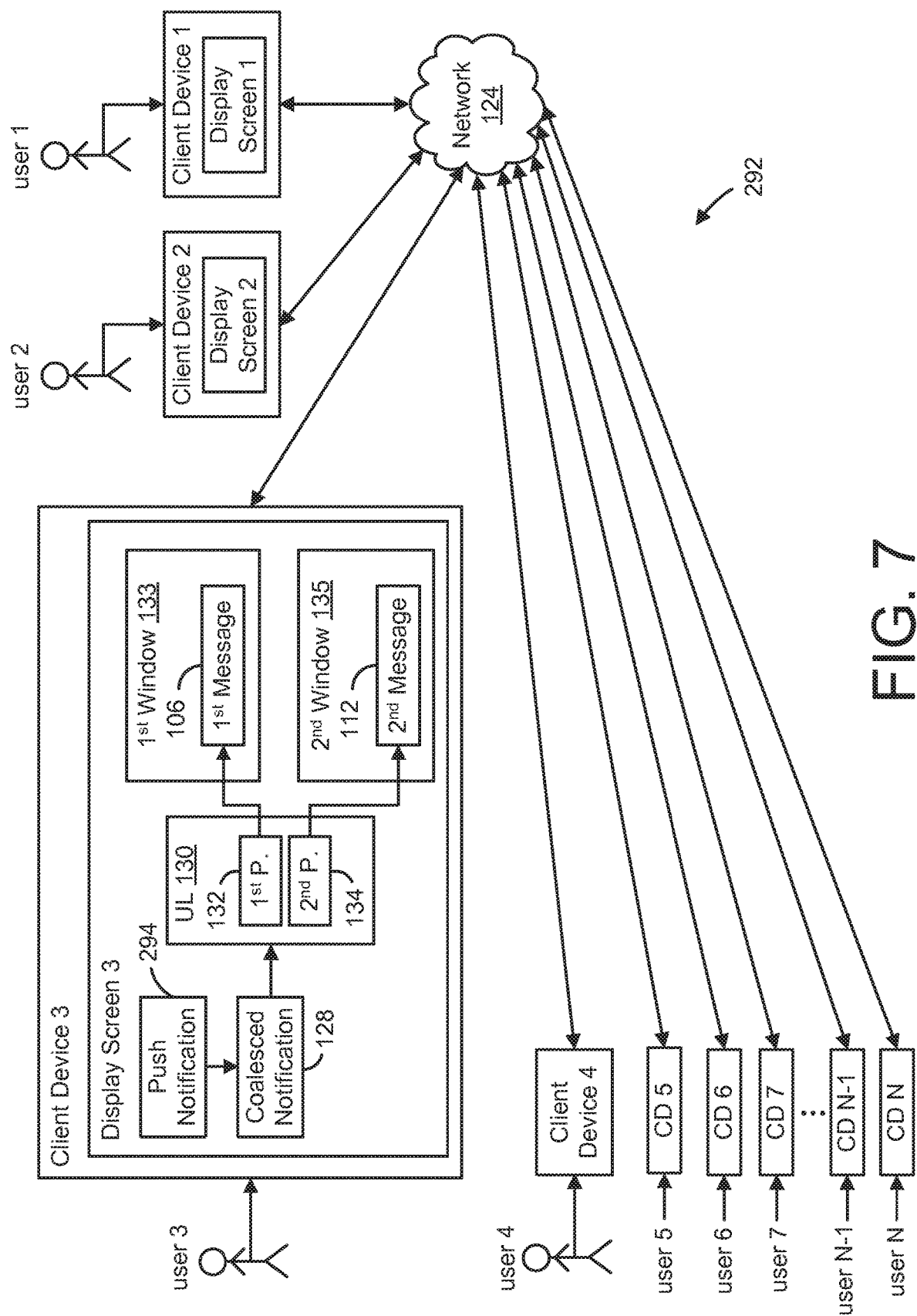
FIG. 7 is a diagram of an architecture that is used to display the first message or the second message after receiving an indication of a selection of a push notification, in accordance with various implementations of the present disclosure.

FIG. 7 is a diagram of several implementations of an architecture 292 that is used to display the first message 106 or the second message 112 after receiving an indication of a selection of a push notification 294. When the first message 106 is sent by the user 1 to the user 2 and the second message 112 is sent by the user 2 to the user 3, push notification data is generated by the processor 190 (FIG. 1A). The push notification data is sent from the NIC 188 (FIG. 1A) via the network 124 to the client devices 3, 4, and 5. In addition to sending the push notification data, in various implementations, the processor 190 instructs the NIC 188 to send instructions via the network 124 to the client devices 3, 4, and 5 regarding how and when to display the coalesced notification 128, the first portion 132, the second portion 134, the first message 106, and the second message 112.

When the user 3 accesses the corresponding user account 3, the GPU of the client device 3 applies the rendering program and the instructions to the push notification data to display the push notification 294. Examples of a push notification include an alphanumeric character. As another example, the push notification 294 includes a number 2 when two messages, e.g., the first message 106 and the second message 112, are sent. As yet another example, the push notification 294 includes a number three when three messages are sent by members of the social group 116 to the social group 116 or to other members of the social group 116. As another example, the push notification 294 includes a number of messages that are sent by members of the social group 116 to the social group 116 or to other members of the social group 116.

In response to receiving an indication of a selection of the push notification 294, the GPU of the client device 3 applies the rendering program and the instructions to the push notification 294 to display the coalesced notification 128. In various implementations, instead of an indication of a selection of the push notification 294, an indication of hovering over the push notification 294 by the user 3 via the input device of the client device 3 is received. The remaining operations performed in response to receiving an indication of the coalesced notification 128 are similar as those described above with references to FIGS. 1A, 1B, and 2.

In several implementations in which the third message data 140 (FIG. 4A) is generated, the processor 190 generates push notification data that includes a count of one message, e.g., the third message 142 (FIG. 4B). In these implementations, the third message data 140 is generated after an indication of a selection of the push notification 294 is received by the GPU of the client device 3 from the user 3. For example, the third message 142 (FIG. 4B) is sent from the user account 1 to the user accounts 3, 4, and 5 after the GPU of the client device 3 receives an indication of selection of the push notification 294 by the user 3 via the input device of the client device 3. Moreover, in these implementations, the processor 190 commands the NIC 188 to send to the NIC of the client device 3 the push notification data with instructions as to how and when to display the additional coalesced notification 154 (FIG. 4B), the unified list 158, the first window 134, the second window 135, and the third window 160. Also, the processor 190 commands the NIC 188 to send the third portion 156 (FIG. 4B) and the third message 142

(FIG. 4B) via the network 124 to the client devices 3, 4, and 5. In these implementations, when the user 3 accesses the user account 3, the GPU of the client device 3 applies the rendering program to the push notification data to display a push notification (not shown). As an example, the push notification (not shown) includes a number 1 when the third message 142 (FIG. 4B) is sent by the user 1 after the users 3 selects the push notification 294. Continuing further with these implementations, in response to receiving an indication of a selection of the push notification (not shown), the GPU of the corresponding client device 3, 4, or 5 applies the rendering program and the instructions to the push notification (not shown) to display the additional coalesced notification 154. The remaining operations performed in response to receiving an indication of the additional coalesced notification 154 are similar as those described above with references to FIGS. 4A, 4B, and 5.

It should be noted that in the preceding implementations, instead of an indication of a selection of the push notification (not shown), an indication of hovering over the push notification (not shown) by the user 3 via the input device of the client device 3 is received.

Figure 8:
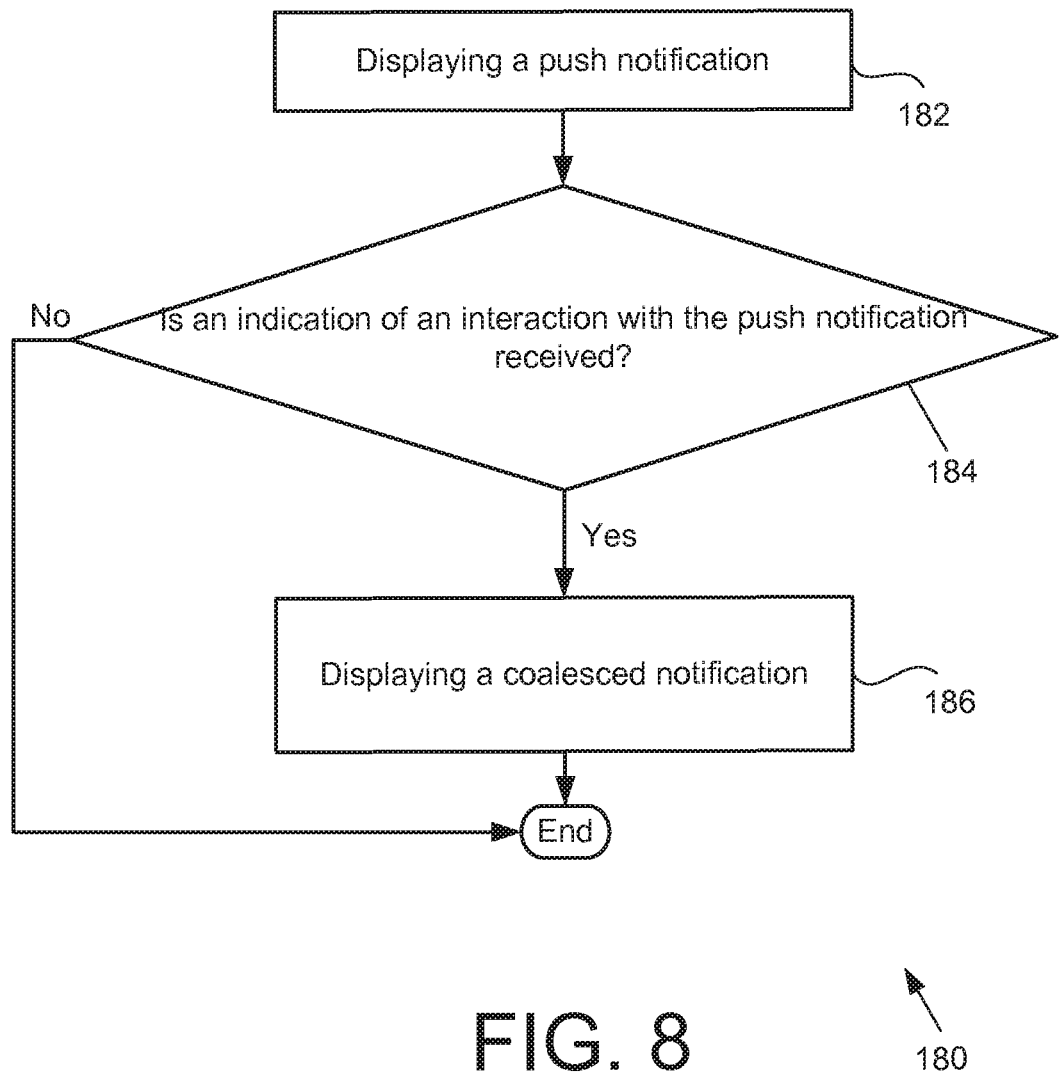
FIG. 8 is a flowchart of a method for displaying the coalesced notification after an indication of a selection of the push notification is received, in accordance with several implementations of the present disclosure.

FIG. 8 is a flowchart of various implementations of a method 180 for displaying the coalesced notification 128 after an indication of a selection of the push notification 294 (FIG. 7) is received. The method 180 is performed by one or more processors of a client device, e.g., the client device 3, 4, or 5 (FIG. 1A). In several implementations, the method 180 is performed by a processor of a client device and a GPU of the client device. In a number of implementations, the method 180 is performed by a GPU of a client device.

In an operation 182, the push notification 294 (FIG. 7) is displayed on the display screen 3. For example, when the user 3 accesses the user account 3, the push notification 294 is displayed on the display screen 3. In an operation 184, it is determined whether an indication of an interaction with the push notification 294 is received by the GPU of the client device 3. For example, it is determined whether an indication of a selection of the push notification 294 via the input device of the client device 3 by the user 3 or an indication of hovering over by the user 3 via the input device is received.

In response to determining that an indication of an interaction of the push notification 294 is not received, the method 180 ends. On the other hand, in response to determining that an indication of an interaction of the push notification 294 is received, in an operation 186, the coalesced notification 128 (FIG. 7) is displayed on the display screen 3. The method 180 ends after the operation 186.

Figure 9:
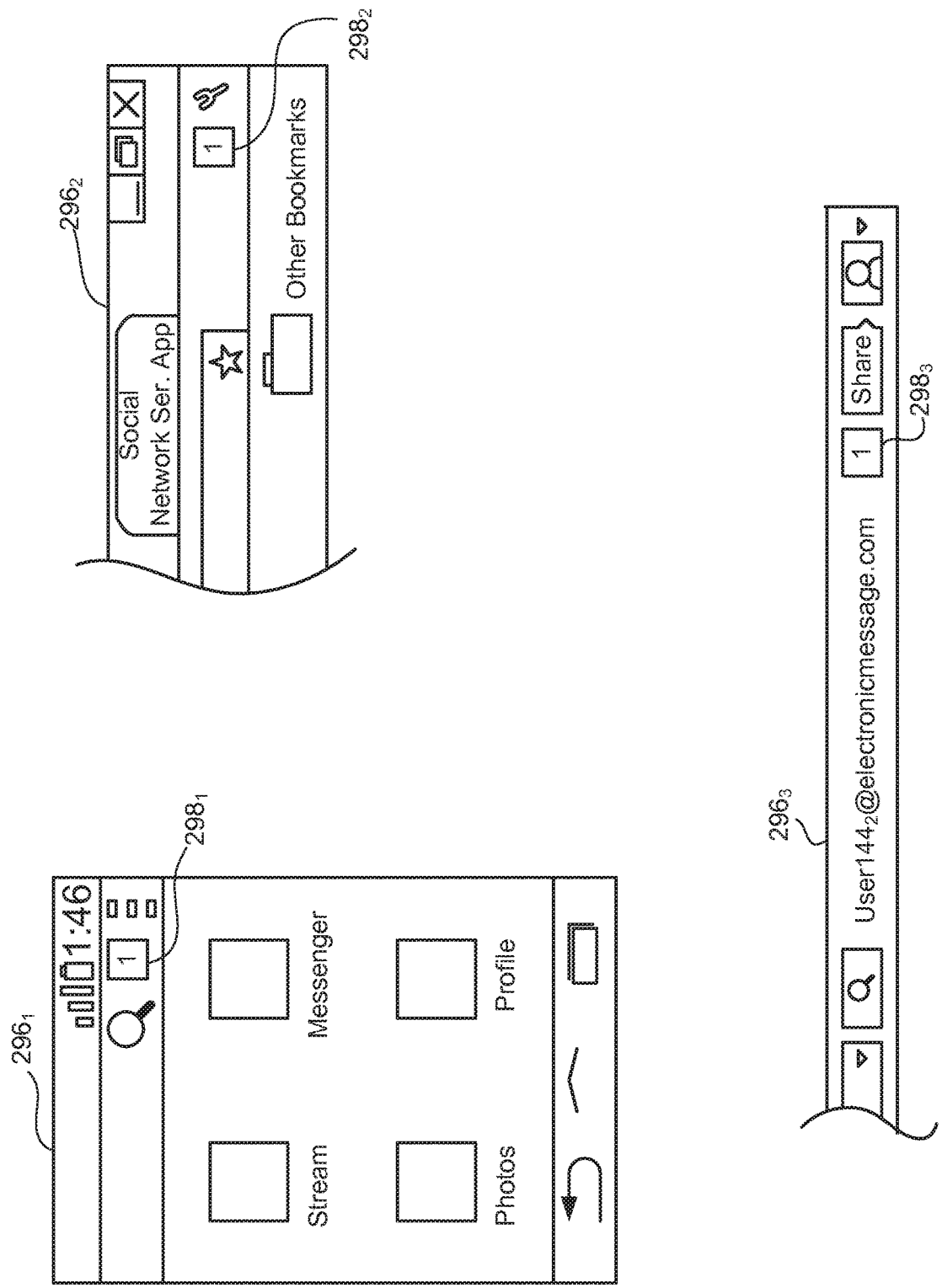
FIG. 9 is a diagram of push notifications that are displayed within different client services, in accordance with various implementations of the present disclosure.

FIG. 9 is a diagram of various implementations of push notifications that are displayed within different client services. A push notification 2981 is displayed within a social network service 2961, which is displayed on a display screen, e.g., the display screen 3, 4, or 5 (FIG. 1A). The social network service 2961 is accessed via an operating system service and provides access to various client services, e.g., a photo storage service, a streaming service, a messenger service, and a profile service. The streaming service allows a user account of a user, e.g., user 3, 4, or 5, to receive network messages from other user accounts of other users and allows the user account to send network messages to the other user accounts. Moreover, the messenger service allows a user to chat via a user account of the user and via a user account of another user to chat with the other user. The profile service allows a user to post information regarding the user, e.g., a name of the user, a marital status of the user, an entity where the user is employed, a university or school that the user is attending, a gender of the user, an electronic message address of the user, a photo of the user, etc. The push notification 2981 indicates that a user having a user account for receiving a social network service has received one network message, e.g., the first message 106 (FIG. 1B), the second message 112 (FIG. 1B), or the third message 142 (FIG. 4B), from another user account of another user. In various implementations, the social network service 2961 is displayed on a display screen of a client device when a user selects, via an input device of the client device, a social network service icon on the display screen.

A push notification 2982 is displayed within a web browser service representation 2962 that is displayed on a display screen of a client device. The push notification 2982 indicates that a network message is received by a user in a user account that is associated with a social network service.

Moreover, another push notification 2983 is displayed within a toolbar service representation 2963. The push notification 2983 indicates that a user has received a network message in his/her user account that is associated with a social network service. The toolbar service representation 2963 includes a picture of a user who is assigned a user account and an electronic message address of the user. Each of the push notifications 298 is an example of the push notification 294 (FIG. 7) or the push notification (not shown) that is selected to display the additional coalesced notification 154 (FIG. 4B).

Figure 10:
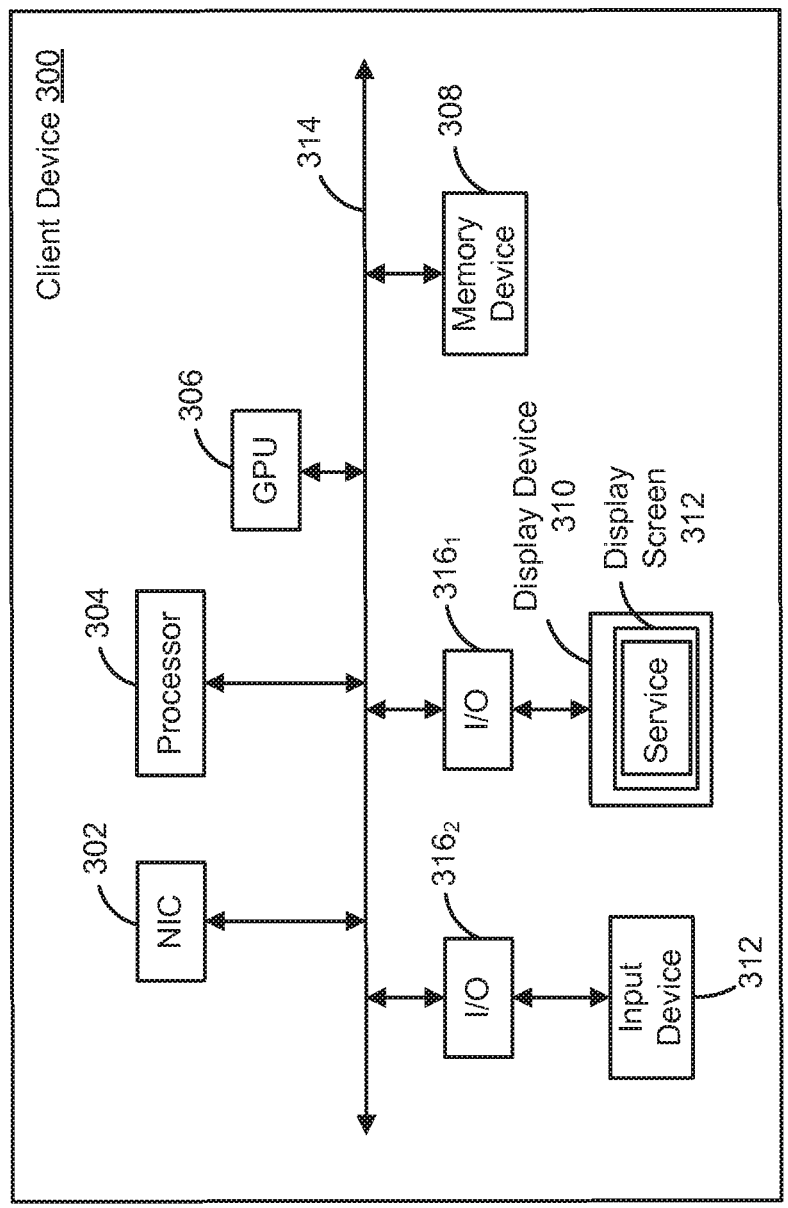
FIG. 10 is a block diagram of a client device, in accordance with several implementations of the present disclosure.

FIG. 10 is a block diagram of various implementations of a client device 300, which is an example of any of the client devices 1 thru N (FIG. 1A). The client device 300 includes a NIC 302, a processor 304, a GPU 306, a memory device 308, a display device 310, and an input device 312. Moreover, a memory device includes a read-only memory (ROM), a random access memory (RAM), or a combination thereof. Examples of a memory device include a flash memory and a hard disk.

Examples of the display device 310 include a liquid crystal display (LCD) device, a light emitting diode (LED) display device, a cathode ray tube (CRT) display device, and a plasma display device. The display device 310 includes the display screen 312 and is coupled with a bus 314 via an input/output interface (I/O) 3161. An I/O provides compatibility between the bus 314 and a device that are coupled with the I/O. For example, the I/O 3161 converts a rate of transfer of data on bus 314 to a rate of transfer of data of display device 310. As another example, an I/O converts a protocol used by one device coupled with the I/O to a protocol that is used by the bus 314 that is coupled with the I/O.

Examples of an input device include a mouse, a keypad, a keyboard, and a stylus. In several implementations, the input device 312 is integrated within the display screen 310. For example, in such implementations, the input device 312 is a touch screen. The input device 312 is coupled with the bus 314 via an I/O 3162.

The NIC 302 communicates with the server 196 (FIG. 1A) via the network 124 (FIG. 1A). For example, the NIC 302 downloads data from the server 196.

It should be noted that in other implementations, the client device 300 includes any number of processors, memory devices, input devices, display devices, NICs and GPUs. Moreover, in various implementations, all functions that are performed by the GPU 306 are performed by the processor 304.

Implementations described in the present disclosure may be fabricated as computer-readable code on a non-transitory computer-readable storage medium, which is a storage device or a memory device. The non-transitory computer-readable storage medium holds data which may be read by a computer system. Examples of the non-transitory computer-readable storage medium include network attached storage (NAS), a memory device, a ROM, a RAM, a combination of RAM and ROM, a Compact Disc (CD), a Blu¬ray™ disc, a flash memory, a hard disk, and a magnetic tape. The non-transitory computer readable storage medium may be distributed over a network-coupled computer system so that the computer-readable code is stored and executed in a distributed fashion.

Although the method operations were described in a specific order in the flowcharts of FIGS. 2, 5, 6, and 8, it should be understood that some operations may be performed in a different order, when the order of the operations do not affect the expected results. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Implementations presented herein recite a device or apparatus. The apparatus is specially constructed for a purpose. The apparatus includes a processor capable of executing the program instructions of the computer programs presented herein.

Although the foregoing implementations have been described with a certain level of detail for purposes of clarity, it is noted that certain changes and modifications may be practiced within the scope of the appended claims. Accordingly, the provided implementations are to be considered illustrative and not restrictive, not limited by the details presented herein, and may be modified within the scope and equivalents of the appended claims.

What is claimed is:

1. A method comprising:
   receiving, by a client device, a coalesced notification associated with a social group having a plurality of members comprising a first user and a second user, wherein the coalesced notification associated with the social group includes a value specifying a number of messages transmitted between the plurality of members of the social group and does not include contents of the messages transmitted between the plurality of members of the social group, wherein the coalesced notification associated with the social group also includes a visual indication that the number of messages transmitted between the plurality of members of the social group meets a pre-determined number, and wherein the messages comprise one or more messages associated with the first user and one or more messages associated with the second user;
   displaying, on a screen of the client device, the coalesced notification associated with the social group without displaying contents of the messages associated with the first user and contents of the messages associated with the second user;
   detecting, by the client device, a user interaction with the coalesced notification associated with the social group; and
   determining, by the client device and based on the user interaction, that the coalesced notification is to be expanded to present a unified list on the screen of the client device, the unified list comprising a first portion of the messages associated with the first user and a second portion of the messages associated with the second user, wherein the first portion is further expandable to view the contents of the messages associated with the first user, and the second portion is further expandable to view the contents of the messages associated with the second user.

2. The method of claim 1, wherein the coalesced notification comprises identities of one or more users that sent the messages associated with the first user and the second user.

3. The method of claim 1, wherein the coalesced notification comprises an identity of the social group, wherein the identity of the social group is represented by at least one of a name of an entity associated with the social group, an image of the entity, a topic discussed by the social group or a message thread used by the social group.

4. The method of claim 1, wherein each of the first portion and second portion includes an interface for expanding the first portion or the second portion in a respective window that expands from the unified list.

5. The method of claim 1, wherein the interaction with the coalesced notification comprises at least one of: a hover over event or a selection of the coalesced notification.

6. The method of claim 1, further comprising:
   in response to a user interaction with the first portion of the messages on the unified list, displaying the first messages in a first window; and
   in response to a user interaction with the second portion of the messages on the unified list, displaying the second messages in a second window.

7. The method of claim 6, wherein the first window and the second window are located beside the unified list, and the unified list is located beside the coalesced notification.

8. A system comprising:
   a memory to store message data; and
   a processing device, operatively coupled to the memory, to:
   receive, by a client device, a coalesced notification associated with a social group having a plurality of members comprising a first user and a second user, wherein the coalesced notification associated with the social group includes a value specifying a number of messages transmitted between the plurality of members of the social group and does not include contents of the messages transmitted between the plurality of members of the social group, wherein the coalesced notification associated with the social group also includes a visual indication that the number of messages transmitted between the plurality of members of the social group meets a pre-determined number, and wherein the messages comprise one or more messages associated with the first user and one or more messages associated with the second user;
   display, on a screen of the client device, the coalesced notification associated with the social group without displaying contents of the messages associated with the first user and contents of the messages associated with the second user;
   detect a user interaction with the coalesced notification associated with the social group; and
   determine, based on the user interaction, that the coalesced notification is to be expanded to present a unified list on the screen of the client device, the unified list comprising a first portion of the messages associated with the first user and a second portion of the messages associated with the second user, wherein the first portion is further expandable to view the contents of the messages associated with the first user, and the second portion is further expandable to view the contents of the messages associated with the second user.

9. The system of claim 8, wherein coalesced notification comprises identities of one or more users that sent the messages associated with the first user and the second user.

10. The system of claim 8, wherein the coalesced notification comprises an identity of the social group, wherein the identity of the social group is represented by at least one of a name of an entity associated with the social group, an image of the entity, a topic discussed by the social group or a message thread used by the social group.

11. The system of claim 8, wherein each of the first portion and second portion includes an interface to expand the first portion or the second portion in a respective window that expands from the unified list.

12. The system of claim 8, wherein the interaction with the coalesced notification comprises at least one of: a hover over event or a selection of the coalesced notification.

13. The system of claim 8, wherein the coalesced notification comprises an identity of the social group, wherein the identity of the social group is represented by at least one of a name of an entity associated with the social group, an image of the entity, a topic discussed by the social group or a message thread used by the social group.

14. The system of claim 8, wherein the processing device is further to:
in response to a user interaction with the first portion of the messages on the unified list, display the first messages in a first window; and
in response to a user interaction with the second portion of the messages on the unified list, display the second messages in a second window.

15. A non-transitory computer-readable medium comprising instructions, that when executed by one or more processing devices of a client device, cause the one or more processing devices to:
receive a coalesced notification associated with a social group having a plurality of members comprising a first user and a second user, wherein the coalesced notification associated with the social group includes a value specifying a number of messages transmitted between the plurality of members of the social group and does not include contents of the messages transmitted between the plurality of members of the social group, wherein the coalesced notification associated with the social group also includes a visual indication that the number of messages transmitted between the plurality of members of the social group meets a pre-determined number, and wherein the messages comprise one or more messages associated with the first user and one or more messages associated with the second user;
display, on a screen of the client device, the coalesced notification associated with the social group without displaying contents of the messages associated with the first user and contents of the messages associated with the second user;
detect a user interaction with the coalesced notification associated with the social group; and
determine, based on the user interaction, that the coalesced notification is to be expanded to present a unified list on the screen of the client device, the unified list comprising a first portion of the messages associated with the first user and a second portion of the messages associated with the second user, wherein the first portion is further expandable to view the contents of the messages associated with the first user, and the second portion is further expandable to view the contents of the messages associated with the second user.

16. The non-transitory computer-readable medium of claim 15, wherein coalesced notification comprises identities of one or more users that sent the messages associated with the first user and the second user.

17. The non-transitory computer-readable medium of claim 15, wherein the coalesced notification comprises an identity of the social group, wherein the identity of the social group is represented by at least one of a name of an entity associated with the social group, an image of the entity, a topic discussed by the social group or a message thread used by the social group.

18. The non-transitory computer-readable medium of claim 15, wherein each of the first portion and second portion includes an interface to expand the first portion or the second portion in a respective window that expands from the unified list.

19. The non-transitory computer-readable medium of claim 15, wherein the interaction with the coalesced notification comprises at least one of: a hover over event or a selection of the coalesced notification.

20. The non-transitory computer-readable medium of claim 15, wherein processing device is further to:
in response to a user interaction with the first portion of the messages on the unified list, display the first messages in a first window; and
in response to a user interaction with the second portion of the messages on the unified list, display the second messages in a second window.

* * * * *